(12) United States Patent
Suzuki et al.

(10) Patent No.: US 12,543,643 B2
(45) Date of Patent: Feb. 10, 2026

(54) CONTROL DEVICE AND WORK VEHICLE

(71) Applicant: Yanmar Holdings Co., Ltd., Osaka (JP)

(72) Inventors: Hidetaka Suzuki, Okayama (JP); Masaaki Murayama, Okayama (JP); Yuji Yamaguchi, Okayama (JP); Yasuto Nishii, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 197 days.

(21) Appl. No.: 18/120,401

(22) Filed: Mar. 12, 2023

(65) Prior Publication Data

US 2023/0311655 A1 Oct. 5, 2023

(30) Foreign Application Priority Data

Mar. 30, 2022 (JP) ................... 2022-055664

(51) Int. Cl.
*A01D 41/127* (2006.01)
*B60K 35/10* (2024.01)
*B60K 35/22* (2024.01)
*B60K 35/50* (2024.01)
*B60K 35/60* (2024.01)
*B60K 35/80* (2024.01)
*B60K 35/90* (2024.01)
*G05D 1/00* (2006.01)
(Continued)

(52) U.S. Cl.
CPC .......... *A01D 41/1278* (2013.01); *B60K 35/10* (2024.01); *B60K 35/22* (2024.01); *B60K 35/50* (2024.01); *B60K 35/60* (2024.01); *B60K 35/80* (2024.01); *B60K 35/90* (2024.01); *G05D 1/0044* (2013.01); *B60K 35/28* (2024.01); *B60K 35/81* (2024.01)

(58) Field of Classification Search
CPC .. A01B 69/008; A01D 41/02; A01D 41/1278; B60K 35/00; B60K 35/28; B60K 35/81
See application file for complete search history.

(56) References Cited

U.S. PATENT DOCUMENTS

2017/0168501 A1* 6/2017 Ogura .................. G05D 1/0016
2019/0072972 A1* 3/2019 Shinkai ............... G05D 1/0217
(Continued)

FOREIGN PATENT DOCUMENTS

EP 3591489 A1 1/2020
EP 3591489 B1 6/2023
(Continued)

*Primary Examiner* — Dale Moyer
(74) *Attorney, Agent, or Firm* — Chris Mizumoto

(57) ABSTRACT

A control device includes a first acquiring portion, a second acquiring portion, a generating portion, and a display processing portion. The first acquiring portion acquires first information on a work target region in which a work vehicle travels and works in a field. The second acquiring portion acquires second information on a worked region in which the work vehicle has worked. The generating portion generates progress information indicating progress of a work by the work vehicle on the basis of the first information and the second information. The display processing portion causes an index indicating the progress information to be displayed on the display portion.

8 Claims, 14 Drawing Sheets

(51) Int. Cl.
  *B60K 35/28*    (2024.01)
  *B60K 35/81*    (2024.01)

(56)        References Cited

U.S. PATENT DOCUMENTS

2019/0389382 A1* 12/2019 Nishii ........................ G06F 3/14
2021/0321554 A1* 10/2021 Liu ........................ A01C 21/005
2023/0371416 A1* 11/2023 Hoellinger ............ G05D 1/0278

FOREIGN PATENT DOCUMENTS

EP          4191359 A1    6/2023
JP        2017158532 A    9/2017
JP        2020144916 A    9/2020

* cited by examiner

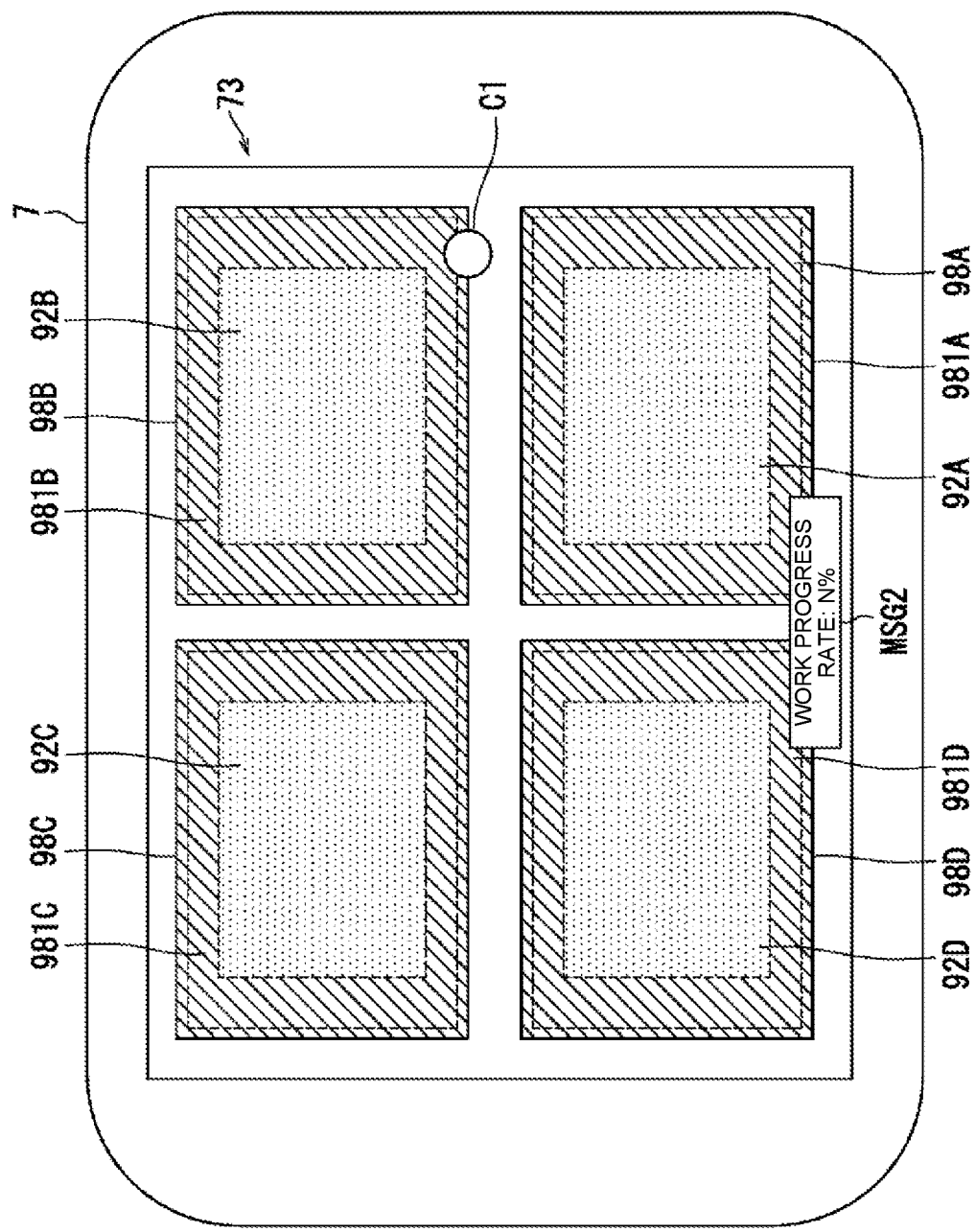

CONTROL DEVICE AND WORK VEHICLE

CROSS-REFERENCE

This application claims foreign priority of JP2022-055664, filed Mar. 30, 2022, the disclosure of which is hereby incorporated by reference in its entirety.

TECHNICAL FIELD

The present invention relates to a control device and a work vehicle.

BACKGROUND ART

A field-work support terminal of Patent Document 1 supports a field work by a field work machine. The field-work support terminal can be detachably attached to the field work machine. The field-work support terminal includes a display portion, a machine-body position information acquiring portion, a work-information acquiring portion, a display control portion, and a communication portion. The machine-body position information acquiring portion acquires machine-body position information indicating a position of the traveling machine body. The work-information acquiring portion acquires work information indicating a work content performed by the field work machine. The display control portion controls display on the display portion. The communication portion communicates with the field work machine. The display control portion displays a work history in the field on a field displayed on the display portion, on the basis of the machine-body position information and the information.

PRIOR ART DOCUMENT

Patent Document

Patent Document 1: Japanese Patent No. 6910926

SUMMARY OF INVENTION

Technical Problem

The field-work support terminal of Patent Document 1 can display the work history, but it cannot grasp work progress against the entire work, and it was difficult for the operator to manage the progress of the work.

The present invention was made in view of the above-mentioned problems, and an object thereof is to provide a control device and a work vehicle for which an operator can easily manage progress of the work.

Solution to Problem

The control device according to the present invention includes a first acquiring portion, a second acquiring portion, a generating portion, and a display processing portion. The first acquiring portion acquires first information on a work target region in which a work vehicle travels and works in a field. The second acquiring portion acquires second information on a worked region in which the work vehicle has worked. The generating portion generates progress information indicating the progress of the work by the work vehicle on the basis of the first information and the second information. The display processing portion causes the display portion to display an index indicating the progress information.

The work vehicle according to the present invention includes the control device described above and is capable of manual travel and automated travel.

Advantageous Effects of Invention

According to the present invention, a control device and a work vehicle for which the operator can easily manage progress of the work cab be provided.

BRIEF DESCRIPTION OF DRAWINGS

FIG. 14 is a diagram illustrating a combine harvester 1 according to the variation 2 and a plurality of fields.

DESCRIPTION OF EMBODIMENTS

Figure 1:
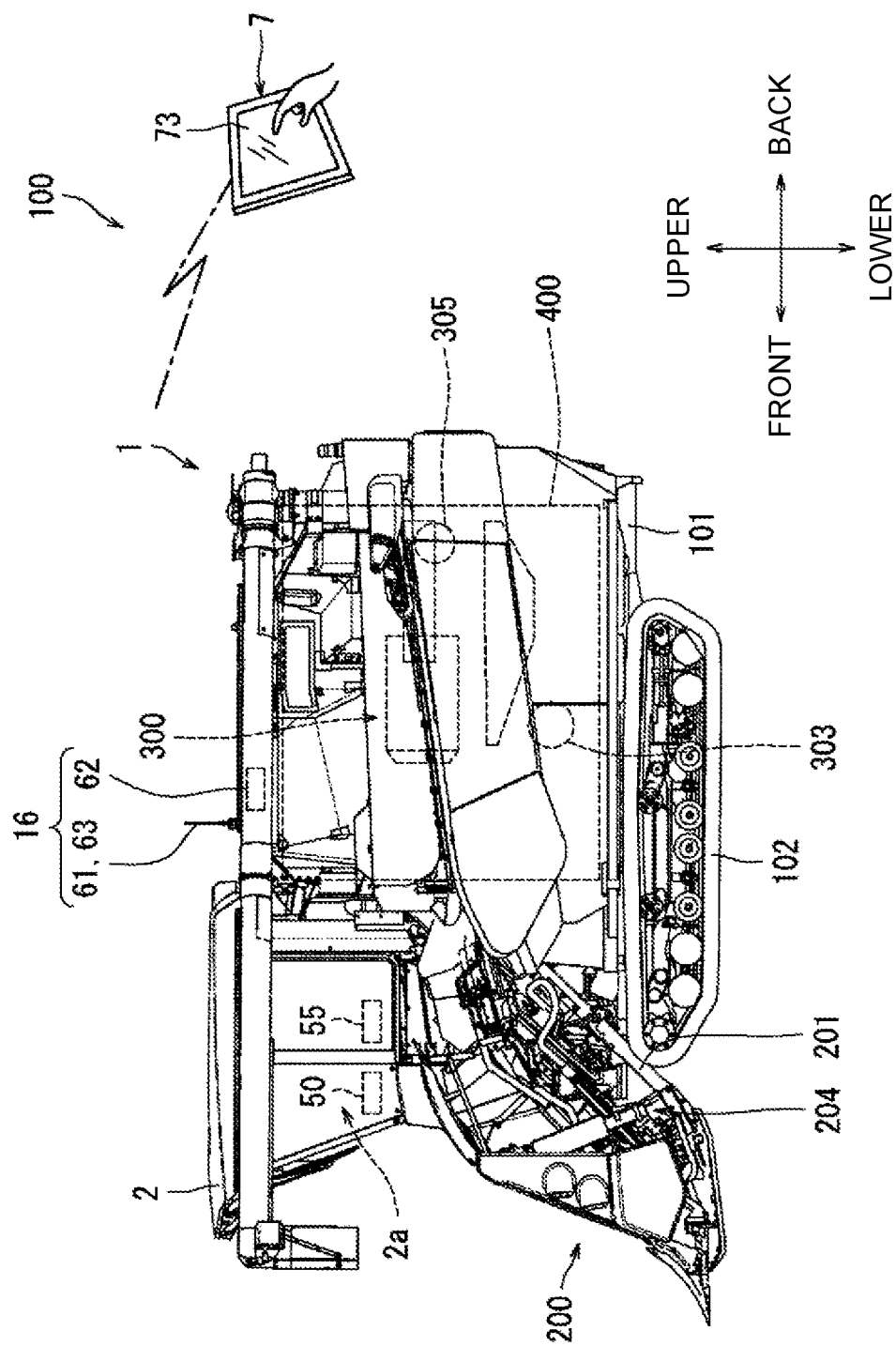
FIG. 1 is a schematic diagram of the crop harvesting system according to this embodiment.
Figure 2:
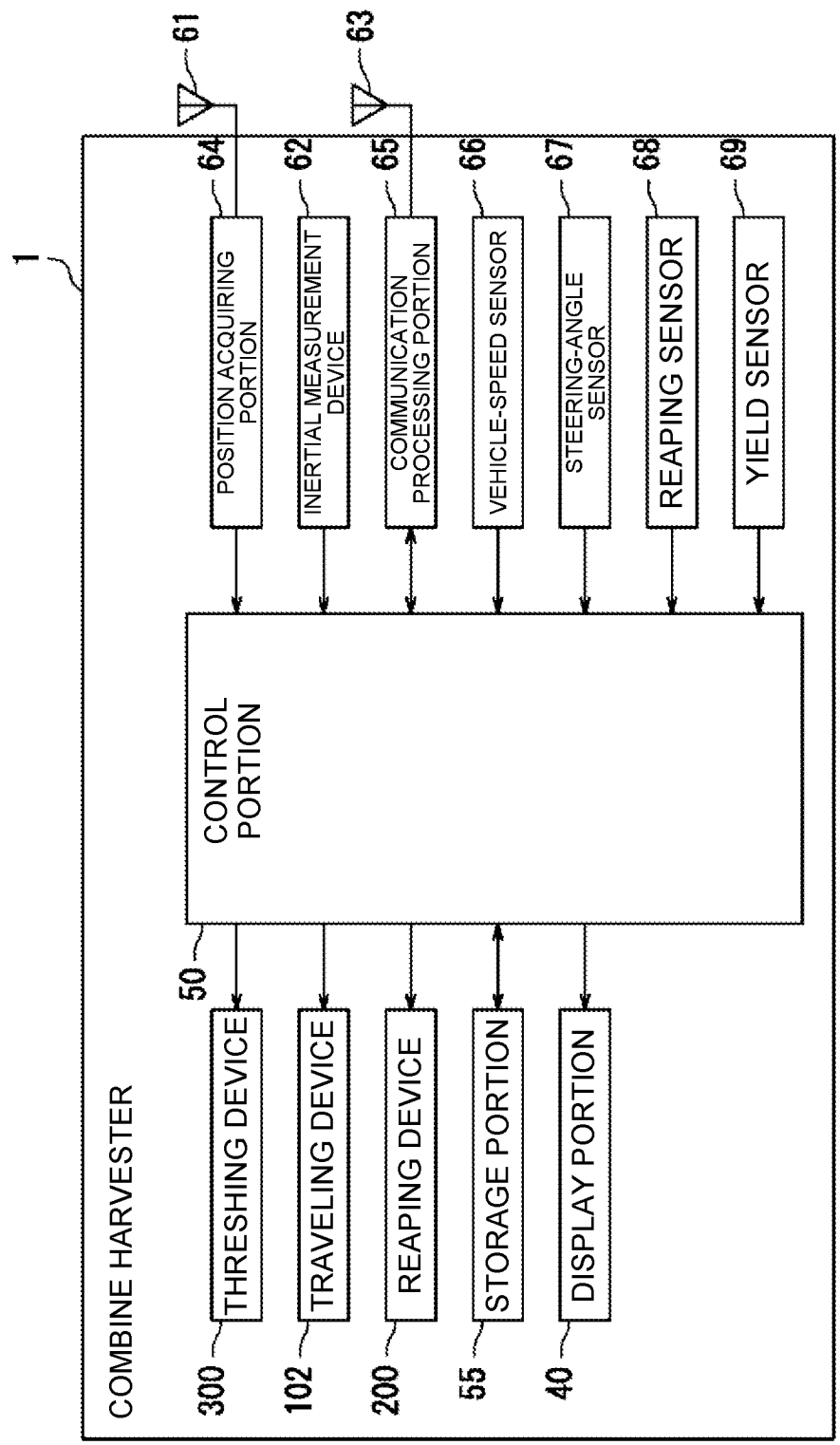
FIG. 2 is a block diagram of a combine harvester in this embodiment.
Figure 3:
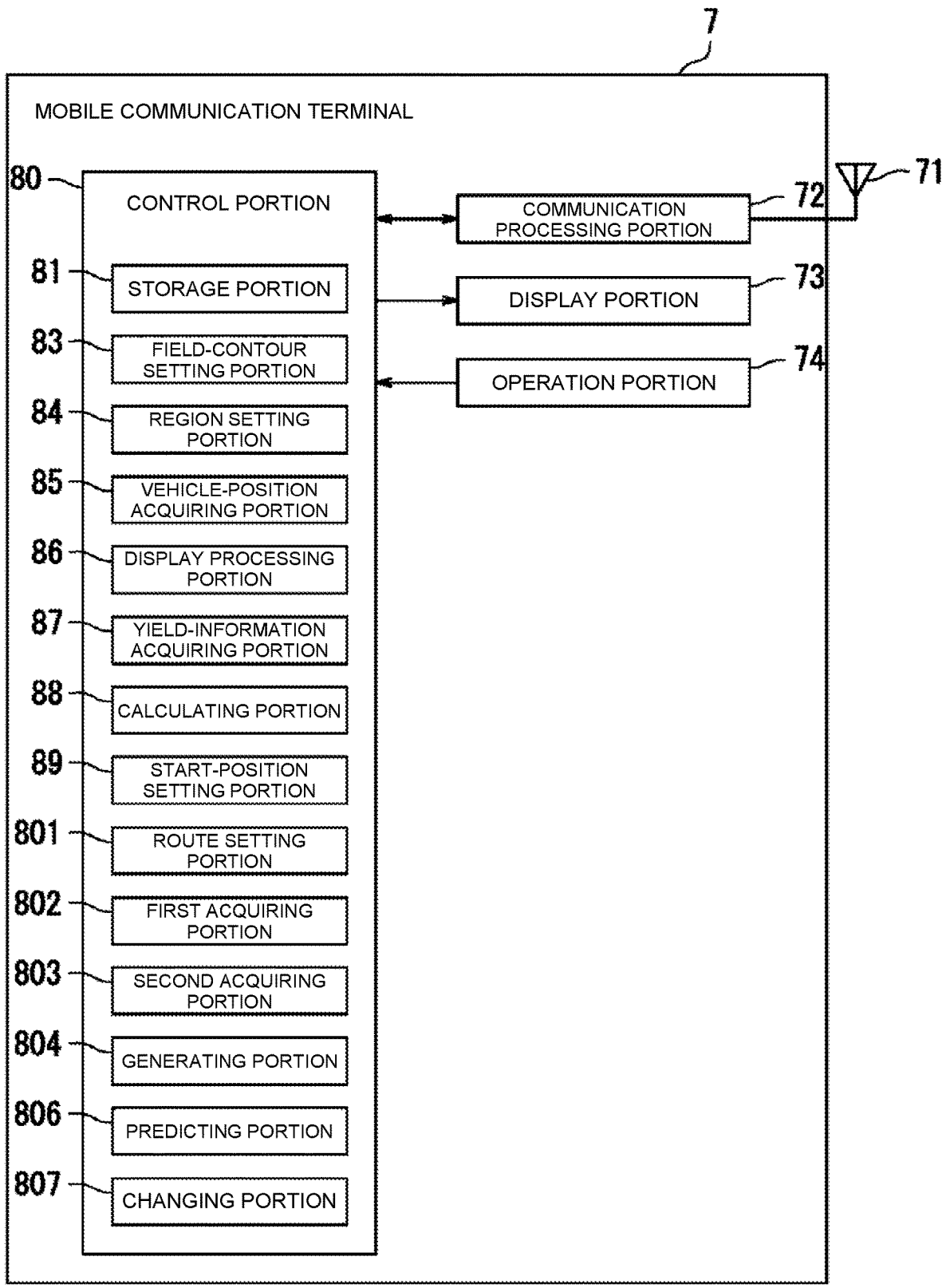
FIG. 3 is a block diagram of a mobile communication terminal in this embodiment.

By referring to FIGS. 1 to 3, a crop harvesting system 100 according to this embodiment will be described. FIG. 1 is a schematic diagram of the crop harvesting system 100 according to this embodiment. FIG. 2 is a block diagram of a combine harvester 1 in this embodiment. FIG. 3 is a block diagram of a mobile communication terminal 7 in this embodiment.

It is to be noted that, for ease of understanding, a front-back direction, a left-right direction, and an up-down direction may be described herein. Here, the front-back direction, the left-right direction, and the up-down direction are as viewed from an operator (that is, a driver) seated on a driver's seat (not shown) disposed in a driving space 2*a* (see FIG. 1). However, the front-back direction, the left-right direction, and the up-down direction are defined only for convenience of description and are not intended to limit directions of the combine harvester 1 of the present invention in use by the definitions of these directions.

The crop harvesting system 100 includes a head-feeding combine harvester 1, which is a work vehicle, and a mobile communication terminal 7. The crop harvesting system 100 is an example of an automated traveling system in which an operator gives instructions using the mobile communication terminal 7 or the like and causes the combine harvester 1 to perform crop harvesting operation and the like while the combine harvester 1 is caused to perform automated travel. It is to be noted that an instruction of automated travel may be given not by the mobile communication terminal 7 but by operating an operation member provided on the combine harvester 1. The combine harvester 1 is an example of a work vehicle. The work vehicle is not limited to the combine harvester 1 but can be any vehicle capable of automated travel in the field. The work vehicles include seeders that travels while sowing seeds in the field, fertilizers that travels while applying a fertilizer to the field, chemical sprayers that travel while spraying chemicals in the field, rice transplanters, cultivators, and tractors that travel while performing planting of seedlings and the like. The harvesting, seeding, fertilizing, chemical application, and planting works are examples of operations by the work vehicles.

The automated travel means that, by controlling a device related to traveling by a control portion 50 provided in the combine harvester 1, at least steering is autonomously performed so that a route specified in advance is followed. Besides, in addition to the steering, it may be so configured that a vehicle speed or a work by a work device or the like is autonomously performed. Automated travel includes a case where a person is on the combine harvester 1 and a case where no person is on the combine harvester 1.

As shown in FIG. 1, the combine harvester 1 in this embodiment includes a traveling machine body 101, a traveling device 102, a reaping device 200, a threshing device 300, a grain tank 400, a control portion 50, a storage portion 55, and a communication device 16. The traveling device 102 is disposed below the traveling machine body 101 and supports the traveling machine body 101. The reaping device 200 is disposed in front of the traveling machine body 101. The reaping device 200 and the threshing device 300 are examples of the work device. The communication device 16 is disposed above the traveling machine body 101. The control portion 50 is disposed inside the traveling machine body 101. The storage portion 55 is disposed inside the traveling machine body 101.

The traveling machine body 101 (combine harvester 1) includes an engine (not shown). The engine is a diesel engine, for example. The engine converts heat energy obtained by combusting fuel into kinetic energy (power).

The traveling device 102 causes the combine harvester 1 to travel. Specifically, the traveling device 102 travels on the basis of the power (kinetic energy) generated in the engine. The traveling device 102 includes, for example, a pair of left and right traveling crawler devices. The pair of left and right traveling crawler devices cause the combine harvester 1 to travel in the front-back direction. Moreover, the pair of left and right traveling crawler devices cause the combine harvester 1 to turn in the left-right direction.

The reaping device 200 is driven on the basis of the power (kinetic energy) generated in the engine. The reaping device 200 reaps unreaped grain culms in the field. In this embodiment, the reaping device 200 includes a reaping frame 201 and a grain-culm conveying device 204.

The reaping frame 201 is mounted on a front part of the traveling machine body 101, capable of elevating. A reaping blade is disposed below the reaping frame 201. The reaping device 200 reciprocally moves the reaping blade to cut a stubble of the unreaped grain culms in the field.

The grain-culm conveying device 204 conveys the reaped grain culms reaped by the reaping blade to the threshing device 300.

The combine harvester 1 can continuously reap the unreaped grain culms in the field by driving the reaping device 200 while moving in the field by driving the traveling device 102.

The threshing device 300 is driven on the basis of the power (kinetic energy) generated in the engine. The threshing device 300 threshes the reaped grain culms conveyed to the traveling machine body 101 by the grain-culm conveying device 204. A threshing work is included in the harvesting operation. The grain tank 400 stores grains threshed by the threshing device 300. Specifically, the threshing device 300 includes a winnowing fan 303 and a dust discharge fan 305. The threshing device 300 threshes ear ends of the reaped grain culms having been conveyed to the traveling machine body 101. The threshing device 300 performs swing sorting (specific gravity sorting) of the threshed ear ends (threshed product).

The winnowing fan 303 supplies sorting air toward the reaped grain culms after threshing. As a result, waste straw and foreign substances in the grains (threshed product) are removed. The grains from which the waste straw and foreign substances were removed are conveyed to the grain tank 400 for storage. The dust discharge fan 305 discharges dusts in a rear part of the grain-culm conveying device 204 to an outside of the machine body.

The traveling machine body 101 (combine harvester 1) further includes a cabin 2. The cabin 2 has a box shape, and the driving space 2a for the operator to sit on the driver's seat and to operate the combine harvester 1 is formed inside the cabin 2. In the driving space 2a, equipment required for operating the combine harvester 1, such as the driver's seat, a steering wheel, a main gear-shift lever and the like, not shown, is disposed. For example, the steering wheel is disposed in front of the driver's seat. The steering wheel is operated by the operator seated on the driver's seat to change a direction in which the traveling device 102 shown in FIG. 1 is traveling. When a mode of the combine harvester 1 is a manual travel mode, the operator can turn the combine harvester 1 by operating the steering wheel. The turns include, for example, 90-degree turns (α turns), U-turns, and fishtail turns.

For example, the main gear-shift lever is disposed to the left of the driver's seat. The main gear-shift lever is operated by the operator seated on the driver's seat and switches the traveling direction of the traveling device 102 shown in FIG. 1 between forward and backward.

The main gear-shift lever has various switches. The various switches of the main gear-shift lever include, for example, a switch for adjusting a handling depth, a switch for raising the reaping device 200, a switch for lowering the reaping device 200, a switch for adjusting a height of the reaping device 200, and a switch for switching whether the power generated by the engine is transmitted to the reaping device 200 and the threshing device 300 or not. The steering wheel, the main gear-shift lever, and the various switches output signals to the control portion 50 indicating instructions in response to the operations by the operator.

The communication device 16 has a positioning antenna 61, an inertial measurement device 62, and a communication antenna 63.

The positioning antenna 61 receives a radio wave (positioning signal) from a positioning satellite that configures a satellite positioning system (GNSS: Global Navigation Satellite System). The inertial measurement device 62 includes a 3-axis angular-speed sensor and a 3-way acceleration sensor.

The communication antenna 63 is an antenna for wireless communication with the mobile communication terminal 7. For the wireless communication, a wireless LAN (local area network) such as Wi-Fi (registered trademark) and a short-range wireless communication such as Bluetooth (registered trademark) can be adopted. Moreover, in the combine harvester 1, an antenna for mobile communication (not shown) for communication using cellular phone lines and the Internet may be provided.

The control portion 50 controls the traveling device 102, the reaping device 200, and the threshing device 300. Specifically, as shown in FIG. 2, the control portion 50 is an arithmetic device such as a CPU (Central Processing Unit).

The control portion 50 receives the signals output from the steering wheel, the main gear-shift lever, the various switches and the like and controls the traveling device 102, the reaping device 200, and the threshing device 300 in accordance with the instructions indicated by the signals. The control portion 50 may be a single piece of hardware or a plurality of pieces of hardware capable of mutual communication.

The storage portion 55 is a main storage device such as a ROM (Read Only Memory) and a RAM (Random Access Memory). The storage portion 55 may further include an auxiliary storage device such as an HDD (Hard Disk Drive) or an SSD (Solid State Drive). In the storage portion 55, various programs and data and the like are stored. The control portion 50 reads various programs from the storage portion 55 and executes them.

Moreover, in addition to the inertial measurement device 62 described above, a position acquiring portion 64, a communication processing portion 65, a vehicle-speed sensor 66, a steering-angle sensor 67, a reaping sensor 68, and a yield sensor 69 are connected to the control portion 50.

The position acquiring portion 64 acquires the position of the combine harvester 1 as information of a latitude and a longitude, for example, by using the positioning signals received by the positioning antenna 61 from the positioning satellites. The position acquiring portion 64 may perform positioning by receiving a positioning signal from a reference station, not shown, by an appropriate method and then by using a well-known RTK-GNSS (Real Time Kinematic GNSS) method. The reference station is installed at a known position around the field. Alternatively, the position acquiring portion 64 may use the Differential DGNSS (Differential GNSS) method to perform the positioning. Alternatively, the position acquiring portion 64 may acquire a position on the basis of radio wave intensity, such as wireless LAN, or by inertial navigation using measurement results of the inertial measurement device 62.

The communication processing portion 65 transmits and receives data to and from the mobile communication terminal 7 via the communication antenna 63.

The vehicle-speed sensor 66 detects a vehicle speed of the combine harvester 1. The vehicle-speed sensor 66 is provided on an axle or the like disposed on the traveling device 102. When the vehicle-speed sensor 66 is provided on the axle of the traveling device 102, the vehicle-speed sensor 66 generates pulses according to rotation of the axle. Data of detection results acquired by the vehicle-speed sensor 66 is output to the control portion 50.

The steering-angle sensor 67 is installed on the steering wheel, for example, and detects the steering angle of the steering wheel. Data of the detection result acquired by the steering-angle sensor 67 is output to the control portion 50.

The reaping sensor 68 detects a height of the reaping device 200 and a driving status of the reaping device 200. Data of the detection results acquired by the reaping sensor 68 is output to the control portion 50. The control portion 50 can determine whether the reaping device 200 is performing a reaping work or not on the basis of the detection result of the reaping sensor 68. The reaping work is included in the harvesting operation.

The yield sensor 69 detects an amount of grains harvested by the combine harvester 1. The yield sensor 69 outputs information indicating the detected amount of grains to the control portion 50. For example, the yield sensor 69 is provided in the grain tank 400. The yield sensor 69 measures a degree of impact when grains hit the yield sensor 69 as the grains are conveyed to the grain tank 400 and outputs a measurement result to the control portion 50. The control portion 50 acquires the measurement result of the yield sensor 69 and converts it to a grain mass or volume to generate yield information indicating the amount of grains harvested by the combine harvester 1. The control portion 50 does not have to convert the measurement results of the yield sensor 69. In this case, the yield information indicates the measurement results of the yield sensor 69. The yield sensor 69 is not an indispensable constituent element of the crop harvesting system 100.

In this embodiment, the control portion 50 is capable of controlling the automated traveling of the combine harvester 1, such as vehicle-speed control and steering control. Specifically, the combine harvester 1 can move forward, backward, and turn or the like autonomously under the control of the control portion 50. The control portion 50 can also autonomously perform steering, for example, and at the same time, execute control of changing a vehicle speed in accordance with an operation by the operator.

When the vehicle speed is changed autonomously, the control portion 50 executes control such that the current vehicle speed detected by the vehicle-speed sensor 66 gets closer to a target vehicle speed. The control of the vehicle speed is realized by changing at least either one of a transmission ratio of a gearbox in a transmission case (not shown) and an engine rotation speed. It is to be noted that the control of the vehicle speed includes control of bringing the vehicle speed to zero so that the combine harvester 1 comes to a stop.

When steering is performed autonomously, the control portion 50 executes control of bringing a current steering angle detected by the steering-angle sensor 67 to get closer to a target steering angle. The control of the steering angle is realized, for example, by driving a steering actuator provided on a rotating shaft of the steering wheel. It is to be noted that, instead of driving of the steering actuator, the control portion 50 may adjust the turning angle of the traveling device 102 by directly adjusting the rotation of each of the left and right traveling crawler devices of the traveling device 102.

The control portion 50 also controls the operations of the reaping device 200 and the threshing device 300 on the basis of the predetermined conditions. Specifically, the control portion 50 controls height adjustment and a reaping work of the reaping device 200 and a threshing work by the threshing device 300.

It is to be noted that, on the basis of detection results of the various sensors, other than control related to the automated travel, control of the operations of the reaping device 200 and the threshing device 300, and determination on continuation of a harvesting operation, the control portion 50 can also execute control of causing the combine harvester 1 to travel, the control of the operations of the reaping device 200 and the threshing device 300, and the determination on the continuation of the harvesting operation in response to remote control by the operator using the mobile communication terminal 7.

Subsequently, by referring to FIG. 3, the mobile communication terminal 7 will be explained. As shown in FIG. 3, the mobile communication terminal 7 includes a communication antenna 71, a communication processing portion 72, a display portion 73, an operation portion 74, and a control portion 80. The mobile communication terminal 7 is a tablet device, a smartphone, a laptop computer or the like. The mobile communication terminal 7 executes various types of processing related to the automated travel of the combine harvester 1 as will be described later, while at least a part of such processing can be executed by the control portion 50 of the combine harvester 1. To the contrary, at least a part of the various types of processing related to the automated travel executed by the control portion 50 of the combine harvester 1 can be executed by the mobile communication terminal 7.

The communication antenna 71 is an antenna for conducting wireless communication with the combine harvester 1. The communication processing portion 72 transmits and receives data to and from the combine harvester 1 via the communication antenna 71. Specifically, the control portion 80 can receive, via the communication processing portion 72 and the communication antenna 71, the detection results and the like of each sensor provided in the combine harvester 1.

As described above, the combine harvester 1 can be connected to a cellular phone line and thus, the mobile communication terminal 7 can be connected to the cellular phone line via the combine harvester 1. Therefore, a part of information stored in the storage portion 55 of the combine harvester 1 or a storage portion 81 of the control portion 80, for example, can be stored in an external server. It is to be noted that the antenna for mobile communication (not shown) may be provided in the mobile communication terminal 7 instead of the combine harvester 1.

The display portion 73 is a liquid crystal display, an organic electroluminescence (EL) display or the like. The display portion 73 is capable of displaying information on the field, information on the automated travel, information on the setting of the combine harvester 1, detection results of the various sensors, warning information and the like, for example.

The operation portion 74 includes at least either one of a touch panel and hardware keys. The touch panel is disposed by overlapping the display portion 73 and can detect an operation by an operator's finger or the like. The hardware key is disposed on a side surface of an enclosure of the mobile communication terminal 7 or in a periphery of the display portion 73 or the like and can detect pressing by the user's finger or the like.

The control portion 80 includes an arithmetic device, an input/output portion and the like, not shown, and the storage portion 81. The control portion 80 is an example of a control device. The arithmetic device is a processor, a microprocessor or the like. The storage portion 81 is a main storage device such as a ROM and a RAM. The storage portion 81 may further include an auxiliary storage device such as an HDD or SSD. In the storage portion 81, various programs and data and the like are stored. The arithmetic device reads the various programs from the storage portion 81 and executes them. By means of cooperation between the hardware and the software described above, the control portion 80 can be operated as a field-contour setting portion 83, a region setting portion 84, a vehicle-position acquiring portion 85, a display processing portion 86, a yield-information acquiring portion 87, a calculating portion 88, a start-position setting portion 89, and a route setting portion 801. The processing executed by the field-contour setting portion 83, the region setting portion 84, the vehicle-position acquiring portion 85, the display processing portion 86, the yield-information acquiring portion 87, the calculating portion 88, the start-position setting portion 89, and the route setting portion 801 will be described below. It is to be noted that, instead of the mobile communication terminal 7, the combine harvester 1 may include the control portion 80, which is an example of a control device.

Figure 4:
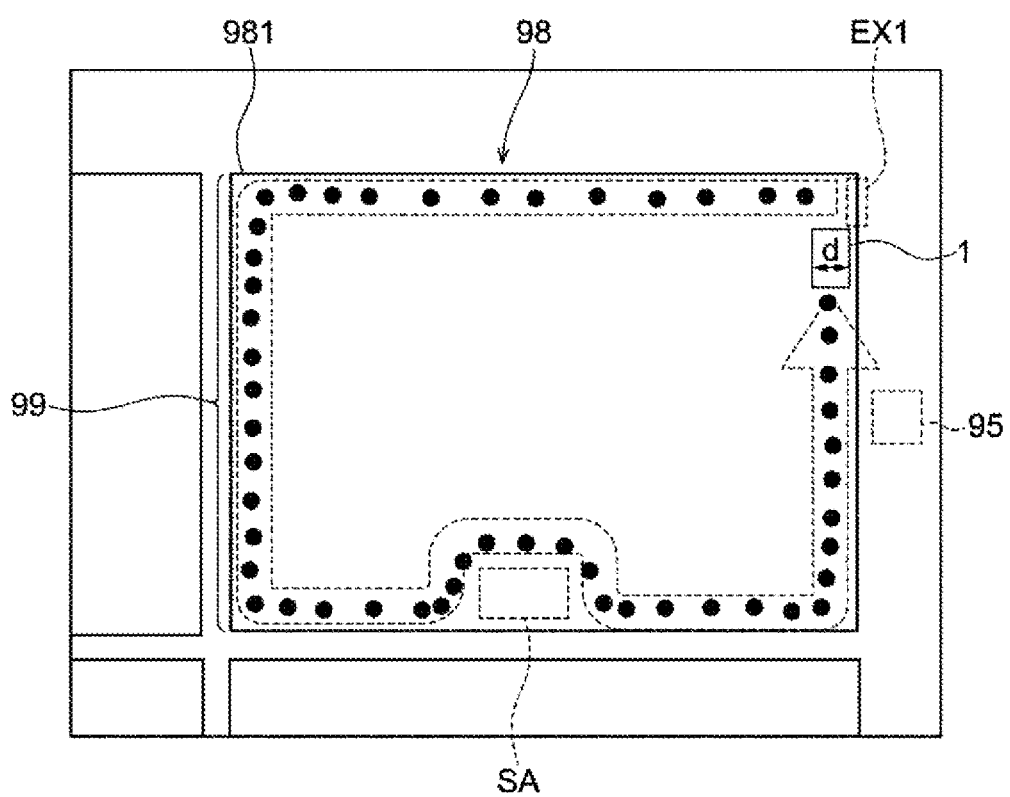
FIG. 4 is a diagram illustrating a field on which the combine harvester is traveling in this embodiment.
Figure 5:
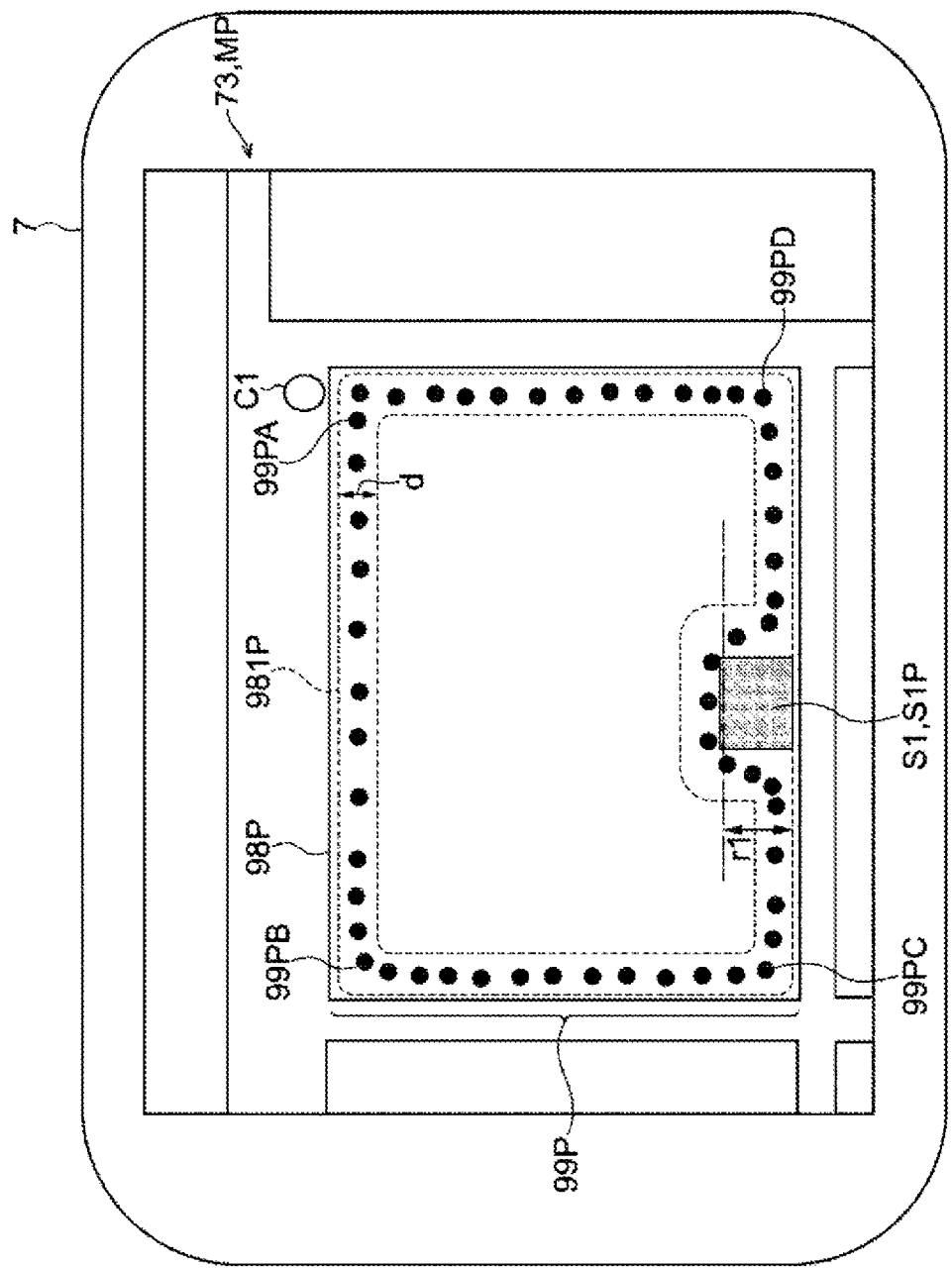
FIG. 5 is a diagram illustrating an example of a screen displayed on a display portion in this embodiment.

Subsequently, by referring to FIGS. 4 and 5, the automated travel of the combine harvester 1 in this embodiment will be explained. FIG. 4 is a diagram illustrating a field 98 on which the combine harvester 1 is traveling in this embodiment. FIG. 5 is a diagram illustrating an example of a screen displayed on the display portion 73 in this embodiment.

As shown in FIG. 5, the display portion 73 displays a map image MP showing the surroundings of the field 98. The map image MP includes a field image 98P showing the field 98. The map image MP may be stored in the storage portion 81, for example, or may be acquired from outside the mobile communication terminal 7 via cellular phone lines and the Internet. Specifically, the display processing portion 86 of the mobile communication terminal 7 acquires the map image MP including the field image 98P and causes the map image MP to be displayed on the display portion 73.

The display processing portion 86 also causes an icon C1 indicating the position of the combine harvester 1 to be displayed on the display portion 73. Specifically, the position acquiring portion 64, the inertial measurement device 62 or the like of the combine harvester 1 detects position information 99 of the combine harvester 1. The communication processing portion 65 transmits the position information 99 detected by the position acquiring portion 64, the inertial measurement device 62 or the like to the mobile communication terminal 7. The communication processing portion 72 of the mobile communication terminal 7 receives the position information 99 transmitted from the combine harvester 1. The vehicle-position acquiring portion 85 acquires the position information 99 received by the communication processing portion 72. The display processing portion 86 identifies the position of the combine harvester 1 on the basis of the position information 99 acquired by the vehicle-position acquiring portion 85 and causes the icon C1 indicating the combine harvester 1 to be displayed at the corresponding position in the map image MP on the display portion 73.

It is to be noted that the position information 99 may include information indicating a direction of the combine harvester 1 detected by the steering-angle sensor 67, the inertial measurement device 62 or the like, that is, the advancing direction. The display processing portion 86 may also change the direction of the icon C1 to match the direction of the combine harvester 1 included in the position information 99.

In this embodiment, when the combine harvester 1 is to perform the automated travel, the operator first causes the combine harvester 1 to manually travel along a contour 981 of the actual field 98. In the example shown in FIG. 4, the operator is causing the combine harvester 1 to manually travel counterclockwise along the contour 981 from an entrance EX1 of the field 98. The combine harvester 1 reaps unreaped grain culms on the travel route while traveling along the contour 981.

As shown in FIG. 4, if there is an obstacle SA in the field 98 along the contour 981, the operator causes the combine harvester 1 to manually travel while avoiding the obstacle SA. Specifically, the combine harvester 1 detours inward from the contour 981 along the obstacle SA.

The position acquiring portion 64, the inertial measurement device 62 or the like periodically detects the position information 99 of the combine harvester 1 during manual travel. A plurality of pieces of the position information 99 of the combine harvester 1 detected by the position acquiring portion 64, the inertial measurement device 62 or the like are sequentially transmitted to the mobile communication terminal 7.

The communication processing portion 72 of the mobile communication terminal 7 receives the plurality of pieces of position information 99 transmitted from the combine harvester 1. The vehicle-position acquiring portion 85 acquires the plurality of pieces of position information 99 received by the communication processing portion 72.

The display processing portion 86 causes a pointer 99P corresponding to each of the plurality of pieces of position information 99 to be displayed at the corresponding positions in the map image MP on the display portion 73 on the basis of the plurality of pieces of position information 99 acquired by the vehicle-position acquiring portion 85.

The field-contour setting portion 83 sets the contour 981P of the field 98 on the basis of the plurality of pieces of position information 99 acquired by the vehicle-position acquiring portion 85 and a vehicle width d of the combine harvester 1. The vehicle width d is stored in the storage portion 81, for example. d does not have to be the width of the vehicle, but may be a reaping width of the reaping device 200 or the like. That is, d only needs to be information indicating the width of the work to be performed by the combine harvester 1.

Contour Setting 1

Subsequently, an example of contour setting processing of the field 98 in this embodiment will be explained. For example, the operator performs an operation on the mobile communication terminal 7 to select four pointers 99PA, 99PB, 99PC, and 99PD out of the plurality of pointers 99P displayed on the display portion 73.

When the operation portion 74 detects the operation to select the pointers 99PA, 99PB, 99PC, and 99PD, the field-contour setting portion 83 sets a substantially rectangular frame contour 981P with the pointers 99PA, 99PB, 99PC, and 99PD as four points at the four corners, respectively. It is to be noted that the field-contour setting portion 83 may also set the substantially rectangular frame connecting pointers 99PA, 99PB, 99PC, and 99PD as the contour 981P.

The field-contour setting portion 83 may select four pointers 99P at the four corners among the plurality of pointers 99P and set the substantially rectangular frame connecting the four pointers 99P as the contour 981P.

Contour Setting 2

Subsequently, another example of the contour setting processing of the field 98 in this embodiment will be explained. For example, the display processing portion 86 calculates a trajectory of the combine harvester 1 traveling through the field 98 on the basis of the plurality of pieces of position information 99 acquired by the vehicle-position acquiring portion 85 and the vehicle width d of the combine harvester 1. The display processing portion 86 causes the calculated trajectory to be displayed by being superimposed on the map image MP on the display portion 73.

The operator, for example, performs an operation on the mobile communication terminal 7 to select the four points at the four corners of the trajectory displayed on the display portion 73. When the operation portion 74 detects the operation to select the four points at the four corners, the field-contour setting portion 83 sets the contour 981P of the substantially rectangular frame with the four points at the four corners as vertices.

The field-contour setting portion 83 may also set the contour 981P further outward from the outside of the trajectory of the combine harvester 1 in the contour setting 1 and the contour setting 2.

Once the contour 981P is set by the field-contour setting portion 83, the region setting portion 84 sets various regions inside the field 98 and outside the field 98 on the basis of the contour 981P.

For example, the region setting portion 84 sets a work target region where the combine harvester 1 works. Specifically, the region setting portion 84 sets the work target region inside the field 98 where the harvesting operation by the combine harvester 1 is performed. For example, the combine harvester 1 travels in the field 98 and performs the harvesting operation in the work target region. Information on the work target region is output as first information to the control portion 80. The control portion 80 controls the storage portion 81 so that the storage portion 81 stores the first information.

The region setting portion 84 also sets a region not subject to the work indicating a region which is not a target for the harvesting operation by the combine harvester 1 inside the field 98 or outside the field 98. For example, the combine harvester 1 performs related works associated with the harvesting operation in the region not subject to the work. The information on the region not subject to the work is output to the control portion 80. The control portion 80 controls the storage portion 81 so that the storage portion 81 stores information on the region not subject to the work.

For example, the region setting portion 84 calculates a non-travelable region S1 in which the combine harvester 1 cannot travel on the basis of the plurality of pieces of position information 99 and the contour 981P and sets it as the region not subject to the work.

Specifically, the region setting portion 84 determines whether there is the non-travelable region S1 inside the contour 981P or not.

Specifically, if the pointer 99P is located at a distance larger than a predetermined distance r1 from the contour 981P toward the inside of the field 98, the region setting portion 84 sets the non-travelable region S1. In the example shown in FIG. 5, three pointers 99P are located at positions away from the contour 981P to the inside of the field 98 by a distance larger than the predetermined distance r1. The region setting portion 84 determines that the region surrounded by the three pointers 99P and the contour 981P is the non-travelable region S1. The region setting portion 84 sets the non-travelable region S1 as the region not subject to the work.

Since the non-travelable region S1 is set on the basis of the contour 981P and the trajectory of the combine harvester 1, operations by the operator to set the non-travelable region S1 is not required. Thus, the non-travelable region S1 can be set more easily.

Subsequently, by referring to FIG. 6, the various other regions that are set in this embodiment will be explained.

Figure 6:
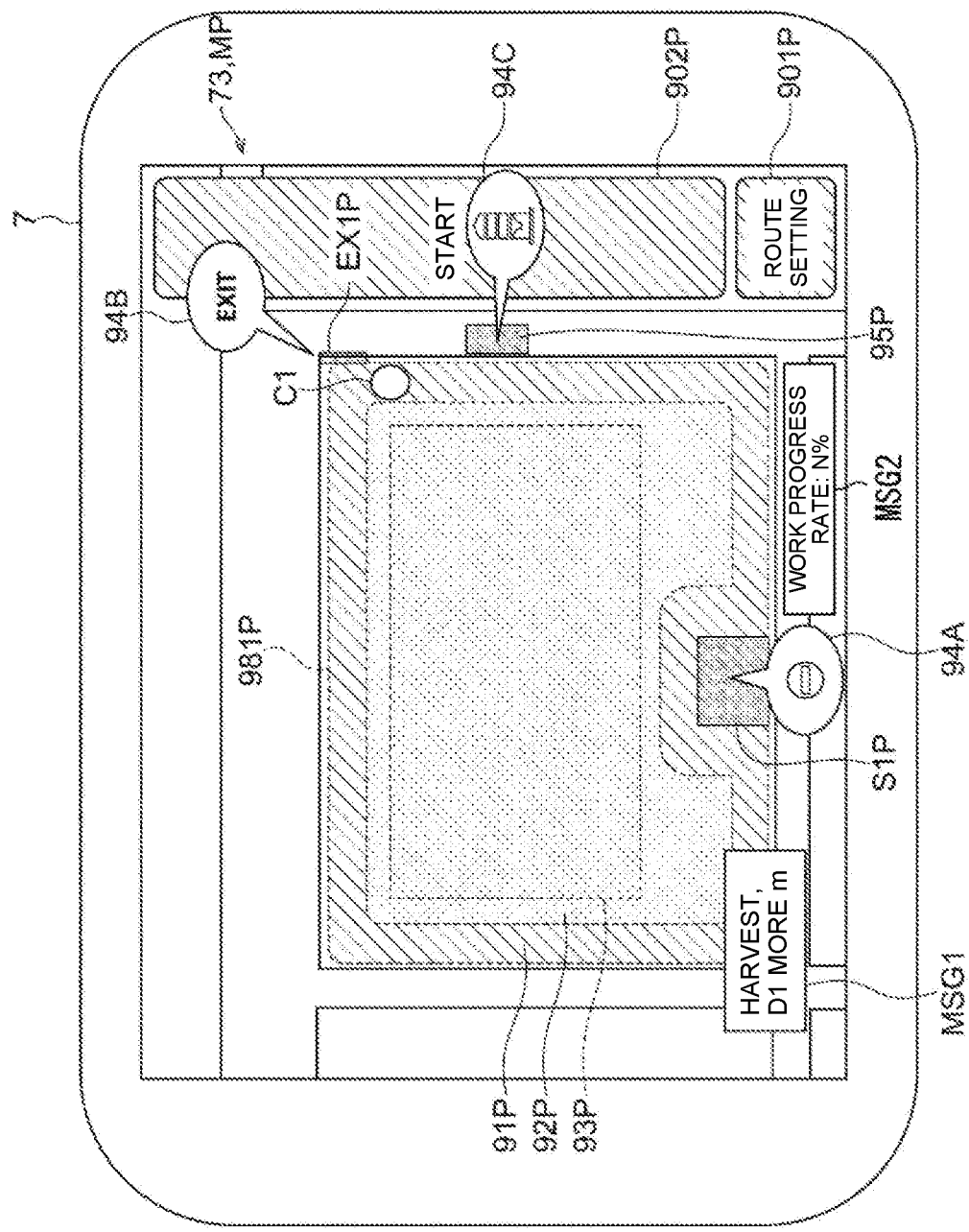
FIG. 6 is a diagram illustrating an example of various regions displayed on the display portion.

FIG. 6 is a diagram illustrating an example of the various regions displayed on the display portion 73.

For example, the region setting portion 84 sets the trajectory that the combine harvester 1 traveled while reaping the unreaped grain culms to the worked region. Specifically, the region setting portion 84 determines whether the combine harvester 1 has reaped the unreaped grain culms on the manually traveled route on the basis of the detection results of the reaping sensor 68. In the example shown in FIGS. 4 to 6, the region setting portion 84 sets the trajectory traveled to set the contour 981P to the worked region. Information on the worked region is output as second information to the control portion 80. The control portion 80 controls the storage portion 81 so that the storage portion 81 stores the second information. The worked region is included in the work target region.

The display processing portion 86 causes a worked region image 91P, which indicates the worked region set by the region setting portion 84, to be displayed by being superimposed on the map image MP on the display portion 73.

The region setting portion 84 also sets the unworked region on the basis of the contour 981P and the worked region. The unworked region indicates the region where there are unreaped grain culms. Specifically, the region setting portion 84 sets the region other than the worked region to the unworked region in the regions inside the contour 981P. The unworked region is included in the work target region. The unworked region indicates a region excluding the worked region from the work target region.

The display processing portion 86 causes an unworked region image 92P, which indicates the unworked region set by the region setting portion 84, to be displayed by being superimposed on the map image MP on the display portion 73.

Furthermore, the region setting portion 84 sets an automated-travel determining line 93P inside the contour 981P. The automated-travel determining line 93P is a determining line for determining whether the combine harvester 1 is capable of starting automated travel or not.

When the combine harvester 1 travels manually to an inside the automated-travel determining line 93P while reaping the unreaped grain culms, it is determined that the combine harvester 1 is capable of starting automated travel. In other words, when the worked region of the combine harvester 1 extends to an inside of the automated-travel determining line 93P, it is determined that the combine harvester 1 is capable of automated travel.

A position and a size of the automated-travel determining line 93P is determined on the basis of, for example, the vehicle width d, turning performance and the like of the combine harvester 1. The region inside the contour 981P of the field 98 and the region outside the automated-travel determining line 93P is the region required as a headland for the automated travel. The headland is used as a space for the combine harvester 1 to turn, to change directions and the like. The headland is also used as a space for the combine harvester 1 to move to a place where the crops harvested by the combine harvester 1 are discharged to trucks or the like (relay region 95, which will be described below). The headland is also used as a space for the combine harvester 1 to move to a place where a fuel to the combine harvester 1 is supplied (relay region 95, which will be described below).

The display processing portion 86 causes the automated-travel determining line 93P set by the region setting portion 84 to be displayed by being superimposed on the map image MP on the display portion 73.

For example, the worked region image 91P, the unworked region image 92P, and the automated-travel determining line 93P are displayed in such a way that the operator can identify each region by displaying them in different colors or the like.

It is to be noted that the region setting portion 84 only needs to set at least the unworked region among the worked region, the unworked region, and the automated-travel determining line.

The display processing portion 86 causes a route-setting button image 901P, a start button image 902P and the like to be displayed by being superimposed on or alongside the map image MP on the display portion 73. The route-setting button image 901P is an operation button for setting a travel route for the combine harvester 1 to perform the automated travel for an unworked region. The start button image 902P is an operation button to start the automated travel of the combine harvester 1. In FIG. 6, the route-setting button image 901P and the start button image 902P are in an inactive state that cannot be operated by the operator. The route setting button and the start button are images such as the route-setting button image 901P and the start button image 902P in FIG. 6 but may be hardware keys.

The region setting portion 84 also sets the relay region 95 (see FIG. 4) to the region not subject to the work. The relay region 95 indicates a region through which the combine harvester 1 goes when it performs the harvesting operation. In other words, the relay region 95 indicates the region where a relay work for allowing the combine harvester 1 to continue the harvesting operation is performed. The relay work includes, for example, a work of discharging crops harvested by the combine harvester 1 to a truck or the like, a refueling work to the combine harvester 1 and the like. The relay work is an example of the related works. Coordinates of the relay region 95 are stored in the storage portion 81.

For example, when the relay region 95 is to be set, the operator operates the operation portion 74 of the mobile communication terminal 7 to select a certain point on the map image MP displayed on the display portion 73. The region setting portion 84 acquires the coordinates of the point selected by the operator from the operation portion 74. The region setting portion 84 determines whether the coordinates of the selected point are located inside the contour 981P or located outside the contour 981P on the basis of the acquired coordinates and the contour 981P. If the coordinates of the selected point are located outside the contour 981P, the region setting portion 84 sets a predetermined region including the selected point to the relay region 95.

In this embodiment, the relay region 95 may be set by the operator. The relay region 95 set by the operator is, for example, at least any one of a plurality of sides constituting the field 98. Alternatively, the relay region 95 may be at least one point on one side, rather than an entire side. The region setting portion 84 acquires the coordinates of one point or one side selected by the operator from the operation portion 74 and sets the selected one point or one side to the relay region 95.

The region setting portion 84 also sets the entrance EX1 of the field 98 (see FIG. 4) to the region not subject to the work. At the entrance EX1, an entering work is performed to admit the combine harvester 1 into the field 98. The entering work is an example of the related works associated with the harvesting operations. For example, the region setting portion 84 calculates the coordinates at which the combine harvester 1 passed the contour 981P on the basis of the plurality of pieces of position information 99 and the contour 981P. The region setting portion 84 sets a predetermined region that includes the point indicated by the calculated coordinates to the entrance EX1. In the example shown in FIG. 4, the entrance EX1 is at an upper right corner of the contour 981P. The shape and the size of the entrance EX1 is determined, for example, on the basis of the vehicle width d of the combine harvester 1. In the example shown in FIG. 4, the shape of the entrance image EX1P is a substantial rectangle. The coordinates of the entrance EX1 are stored in the storage portion 81.

It is to be noted that the entrance EX1 may be set by the operator. When the operator is to set the entrance EX1, the operator operates the operation portion 74 of the mobile communication terminal 7 to select the point corresponding to the entrance EX1 in the map image MP displayed on the display portion 73. The region setting portion 84 acquires the coordinates of the point selected by the operator from the operation portion 74 and sets a predetermined region including the selected point to the entrance EX1.

Identification Image

In this embodiment, the display processing portion 86 causes an identification image for the operator to identify the region not subject to the work and the field image 98P to be displayed on the display portion 73.

As shown in FIG. 6, the display processing portion 86 causes a non-travelable region image S1P, which indicates the non-travelable region S1, to be displayed by being superimposed on the map image MP on the display portion 73, for example. Specifically, the display processing portion 86 acquires the coordinates of the non-travelable region S1 set by the region setting portion 84. The display processing portion 86 causes the non-travelable region image S1P to be displayed at the position indicated by the acquired coordinates in the map image MP.

Furthermore, the display processing portion 86 causes a non-travelable region identification image 94A, which indicates the non-travelable region S1, to be displayed by being superimposed on the non-travelable region image S1P. The non-travelable region identification image 94A is an example of an identification image. The identification image is displayed, for example, as a pin, an icon or the like. For example, the non-travelable region identification image 94A includes a picture depicting a "No Entry" sign.

The display processing portion 86 causes the entrance image EX1P, which indicates the entrance EX1 of the field 98, to be displayed by being superimposed on the map image MP on the display portion 73. Specifically, the display processing portion 86 acquires coordinates of the entrance EX1 stored in the storage portion 81. The display processing portion 86 causes the entrance image EX1P to be displayed at the position indicated by the acquired coordinates in the map image MP. The shape and the size of the entrance image EX1P is determined in accordance with the shape and the size of the entrance EX1, for example.

Furthermore, the display processing portion 86 causes an entrance identification image 94B, which indicates the entrance EX1, to be displayed by being superimposed on the entrance image EX1P. The entrance identification image 94B is an example of an identification image. For example, the entrance identification image 94B includes the characters "EXIT" indicating the entrance.

The display processing portion 86 causes a relay region image 95P, which indicates the relay region 95, to be displayed by being superimposed on the map image MP on the display portion 73. The display processing portion 86 acquires coordinates of the relay region 95 stored in the storage portion 81, for example. The display processing portion 86 causes the relay region image 95P to be displayed at the position indicated by the acquired coordinates. In the example shown in FIG. 6, the shape of the relay region image 95P is a substantial rectangle.

Furthermore, the display processing portion 86 causes a relay-region identification image 94C, which indicates the relay region 95, to be displayed by being superimposed on the relay region image 95P. The relay-region identification image 94C is an example of an identification image. For example, the relay-region identification image 94C includes a picture of a "silo".

As described above, the various regions not subject to the work target are set on the basis of the trajectory traveled by the combine harvester 1, and an identification image is added to each of the images showing the regions not subject to the work target so that it becomes easier for the operator to see each region not subject to the work inside the field and outside the field.

For example, by adding the non-travelable region identification image 94A to the non-travelable region image S1P, the operator can easily recognize the non-travelable region S1, by adding the entrance identification image 94B to the entrance image EX1P, the operator can easily recognize the entrance EX1, and by adding the relay-region identification image 94C to the relay region image 95P, the operator can easily recognize the relay region 95.

It is to be noted that a display format of the identification image is not limited to the above. Specifically, characters or pictures included in the identification image are not particularly limited. Colors, designs, pattern, fonts, sizes and the like of the characters or pictures included in the identification image are not particularly limited, either.

For example, the display format of the identification image can be changed by the operator's changing operation. The changing operation refers to an operation in which the operator instructs the operation portion 74 of the mobile communication terminal 7 to change the display format of the identification image.

Specifically, when the operator performs the changing operation, the operator selects an arbitrary identification image from the identification images displayed on the display portion 73. The identification image selected by the operator is referred to as the selected identification image. For example, when the operator taps the non-travelable region identification image 94A among the non-travelable region identification image 94A, the entrance identification image 94B, and the relay-region identification image 94C displayed on the display portion 73, the tapped non-travelable region identification image 94A is selected as the selected identification image. The display processing portion 86 then causes a setting screen that allows the operator to set the display format of the selected identification image to be displayed. For example, when the operator selects various settings displayed on the setting screen by tapping, the display processing portion 86 causes the non-travelable region identification image 94A that reflects the selected settings to be displayed on the display portion 73.

In this embodiment, the display format of the identification image includes, for example, highlighted display in which the selected identification image is displayed with more highlight than identification images other than the selected identification image. The highlighted display includes, for example, blinking display. Specifically, when the operator selects the setting for highlighted display among the various settings displayed on the setting screen, the display processing portion 86 causes the identification image to be displayed with highlight. By highlighting the identification image, it becomes easier to draw the operator's attention to the region corresponding to the highlighted identification image.

Subsequently, by referring to FIGS. 2, 3, and 6, a travel distance display on the display portion 73 will be explained.

In this embodiment, the mobile communication terminal 7 presents to the operator a distance for which the harvesting operation with the combine harvester 1 can be continued, on the basis of the detection results of the yield sensor 69 provided in the combine harvester 1.

For example, the yield-information acquiring portion 87 shown in FIG. 3 acquires the yield information generated by the control portion 50 shown in FIG. 2. For example, the control portion 50 transmits the generated yield information to the mobile communication terminal 7 via the communication processing portion 65 and the communication antenna 63.

The yield-information acquiring portion 87 receives and acquires the yield information transmitted from the combine harvester 1 via the communication antenna 71 and the communication processing portion 72.

The calculating portion 88 calculates a storage volume, which indicates an amount of grains stored in the grain tank 400, on the basis of the yield information acquired by the yield-information acquiring portion 87. Specifically, the calculating portion 88 calculates the storage volume by sequentially adding up the yield information acquired by the yield-information acquiring portion 87.

The calculating portion 88 calculates remaining capacity of the grain tank 400 on the basis of the capacity and the storage volume of the grain tank 400. The remaining capacity is calculated by subtracting the storage volume from the capacity. The capacity of the grain tank 400 is stored, for example, in the storage portion 55 or the control portion 80.

Furthermore, the calculating portion 88 calculates a distance D1 for which the combine harvester 1 can travel before the storage volume reaches the tank capacity on the basis of the remaining capacity of the grain tank 400 and harvestable volume information indicating an amount of grains harvested when the combine harvester 1 travels a unit distance. The harvestable volume information is stored, for example, in the storage portion 55 or the control portion 80. It is to be noted that the harvestable volume information may be calculated by the calculating portion 88. For example, the calculating portion 88 calculates the distance traveled by the combine harvester 1 on the basis of the plurality of pieces of position information 99. The calculating portion 88 calculates the harvestable volume information by dividing the storage volume by the travel distance.

The calculating portion 88 calculates a travelable distance D1 by dividing the remaining capacity by the harvestable volume information.

As shown in FIG. 6, the display processing portion 86 causes a first message image MSG1, which indicates the travelable distance D1 calculated by the calculating portion 88, to be displayed by being superimposed on the map image MP on the display portion 73, for example. The first message image MSG1 shown in FIG. 6 includes a message "Harvest, D1 more m". The first message included in the first message image MSG1 is not limited to that shown in FIG. 6. Other than the first message image MSG1, the display processing portion 86 may also cause a meter image or the like indicating the travelable distance D1 to be displayed on the display portion 73. When the travelable distance D1 is displayed on the display portion 73, the operator can visually recognize the distance for which the harvesting operation can be continued. Therefore, efficiency of the harvesting operations is improved.

Figure 7:
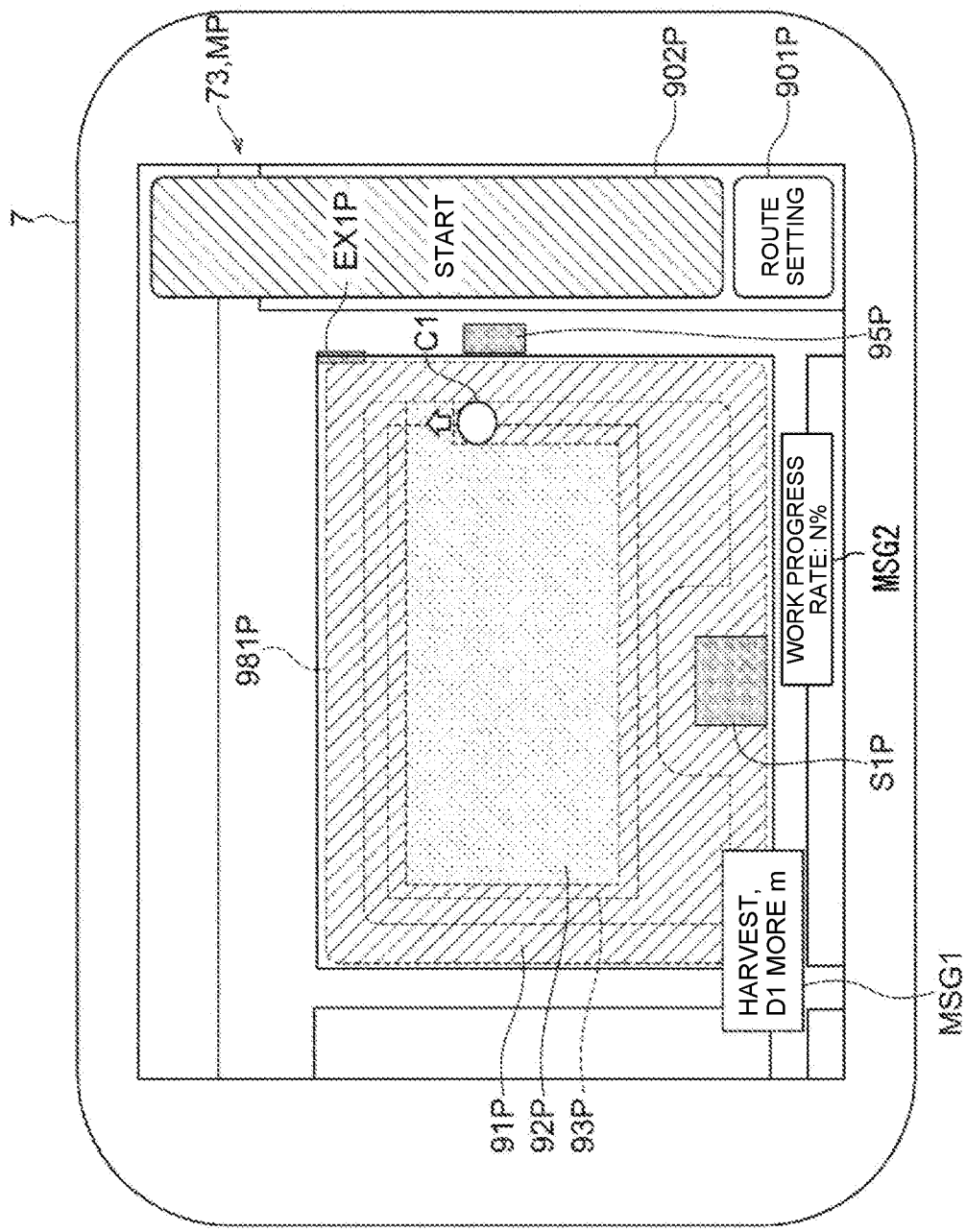
FIG. 7 is a diagram illustrating an example of the screen displayed on the display portion during manual travel.
Figure 8:
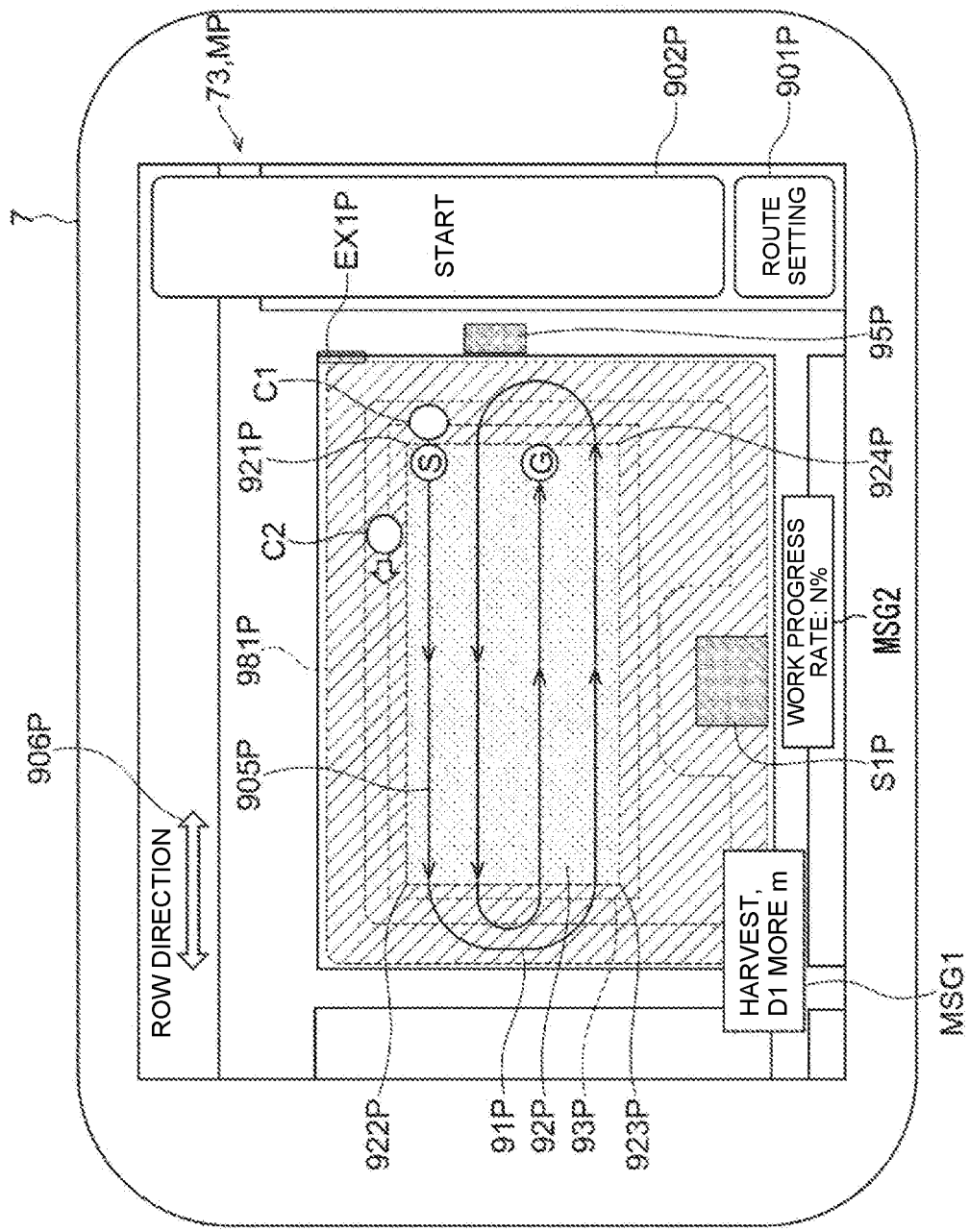
FIG. 8 is a diagram illustrating an example of a travel route for automated travel.
Figure 9:
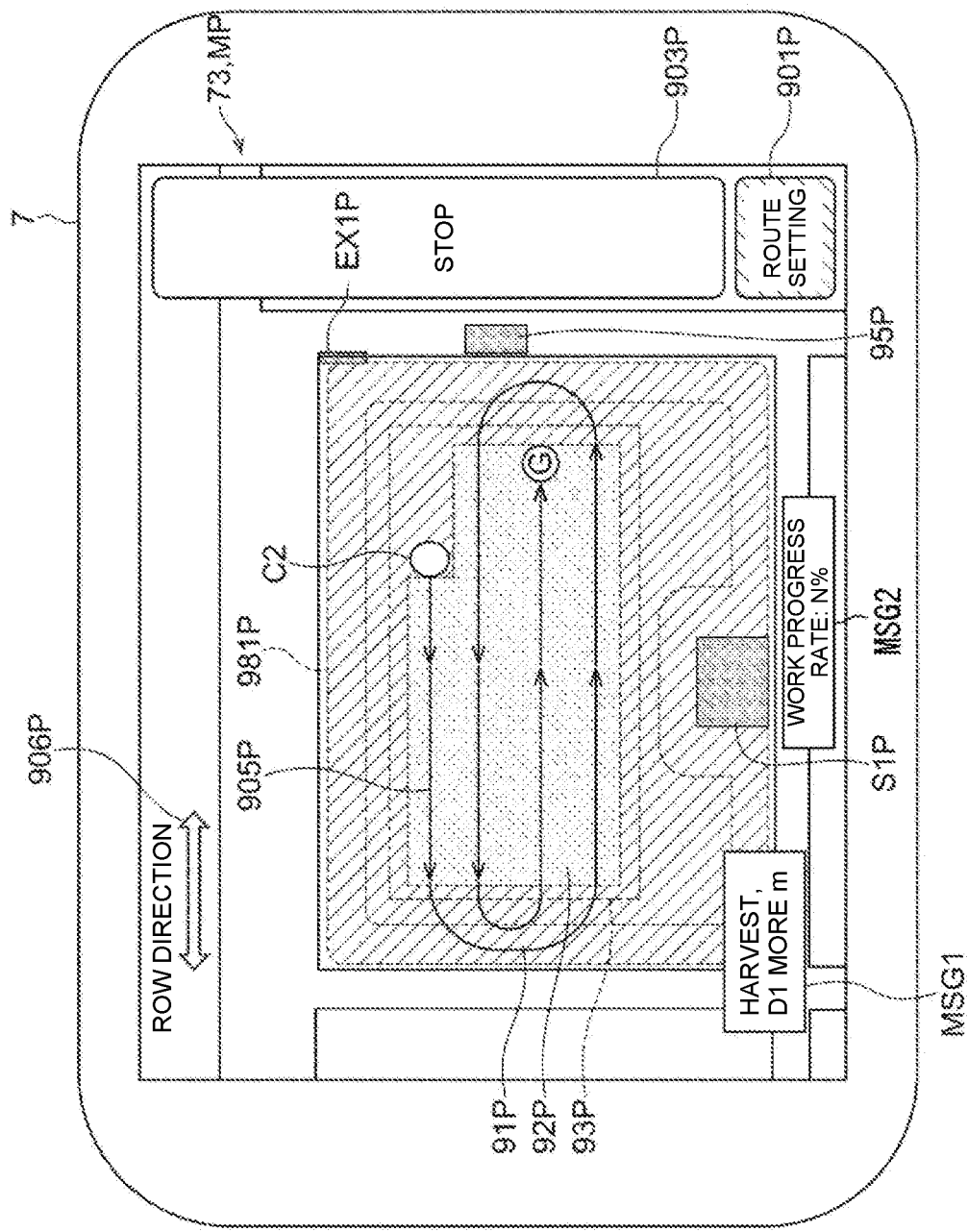
FIG. 9 is a diagram illustrating an example of the screen displayed on the display portion during the automated travel.

Subsequently, by referring to FIGS. 6 to 9, a setting method of an automated-travel start position according to this embodiment will be explained. FIG. 7 is a diagram illustrating an example of the screen displayed on the display portion 73 during the manual travel. FIG. 8 is a diagram illustrating an example of a travel route 905P for automated travel. FIG. 9 is a diagram illustrating an example of the screen displayed on the display portion 73 during the automated travel.

After setting the contour 981P and the various identification images, the operator resumes the reaping work by the manual travel. The region setting portion 84 periodically updates the size of the worked region and the unworked region on the basis of the position information 99 acquired by the vehicle-position acquiring portion 85. The display processing portion 86 causes the worked region image 91P and the unworked region image 92P updated by the region setting portion 84 to be displayed on the display portion 73. The display processing portion 86 also updates a display position of the icon C1 indicating the current position of the combine harvester 1 on the basis of the position information 99 acquired by the vehicle-position acquiring portion 85.

In FIG. 6, the operator completed one round of the round reaping to set the contour 981P of the field 98 by the manual travel. In the subsequent FIG. 7, the operator completes one round of the round reaping (two rounds if the round reaping to set the contour 981P is included) to generate the headland by the manual travel. By repeating the round reaping so as to make an inward spiral, the worked region indicated by the worked region image 91P is enlarged and the unworked region indicated by the unworked region image 92P is reduced. On the other hand, the position and the size of the automated-travel determining line 93P remains unchanged. It is to be noted that the second round and after of the round reaping to generate the headland may be performed by the automated travel only for a straight line.

When the combine harvester 1 travels to the inside the automated-travel determining line 93P, the display processing portion 86 brings the route-setting button image 901P into an active state in which the operator can operate. Alternatively, the display processing portion 86 may bring the route-setting button image 901P into the active state when the worked region of the combine harvester 1 extends to the inside of the automated-travel determining line 93P. In FIG. 7, the route-setting button image 901P is in the active state.

In the example in FIG. 8, the combine harvester 1 completes the second round of the round reaping, and the operator selects and operates the route-setting button image 901P. When the route-setting button image 901P is selected and operated, the start-position setting portion 89 sets a corner closest to the position of the combine harvester 1 among the plurality of corners in the unworked region to the automated-travel start position on the basis of the position information 99 acquired by the vehicle-position acquiring portion 85. The route setting portion 801 sets the travel route 905P for automated travel including the automated-travel start position for the unworked region.

For example, the start-position setting portion 89 sets a corner 921P closest to the position of the combine harvester 1 indicated by the icon C1 among the plurality of corners 921P to 924P of the unworked region indicated by the unworked region image 92P to the automated-travel start position. It is to be noted that, in this embodiment, there are four corners since the unworked region is rectangular, but the number of corners varies depending on the shape of the unworked region.

Since the automated-travel start position is set on the basis of the unworked region and the position of the combine harvester 1, operations by the operator to set the automated-travel start position is not required. Therefore, the automated-travel start position can be set more easily, and the automated travel can be started more easily.

The route setting region 801 sets the travel route 905P along which the combine harvester 1 travels. Specifically, the route setting portion 801 sets the travel route 905P for automated travel with the corner 921P as the automated-travel start position. For example, the route setting portion 801 sets a position shifted to an inside of the unworked region by half the vehicle width d from the corner 921P, which is the automated-travel start position, to a start "S". Then, the route setting portion 801 sets the travel route 905P for automated travel from the start "S" to a goal "G" for the unworked region on the basis of the vehicle width d or the like.

The route setting portion 801 only needs to set the travel route 905P so that the unworked region is located on a left side of the combine harvester 1. That is, the route setting portion 801 only needs to set the leftward travel route 905P. The travel route 905P for automated travel includes a linear route for the reaping work while traveling and an idle running route for moving from one linear route to another linear route while turning or the like. The route setting portion 801 only needs to set a linear route along a row direction. The route setting portion 801 may also include, in the travel route 905P, information on the operation or stoppage of the reaping work and the like, a reaping speed, a reaping height at each position in the travel route 905P as well as information regarding other works.

The display processing portion 86 causes the travel route 905P set by the route setting portion 801 to be displayed by being superimposed on the map image MP on the display portion 73. In FIG. 8, the travel route 905P is an arrow displayed by being superimposed on the unworked region image 92P. The display processing portion 86 also causes the alphabet "S" at the start position and the alphabet "G" at the goal position of the travel route 905P to be displayed. The display processing portion 86 may also display the linear route and the idle running route such that the operator can identify each route by displaying them in different colors or the like. The display processing portion 86 may also display on the display portion 73 a row-direction image 906P indicating the row direction in the unworked region. In the example in FIG. 8, the row-direction image 906P is an arrow indicating the row direction, but it is not limited.

In the example in FIG. 8, the route setting portion 801 set the travel route 905P for the round reaping but it may also set the travel route 905P for reciprocating reaping. The operator only needs to specify in advance or when operating the route-setting button image 901P which of the reciprocating reaping and the round reaping the route setting portion 801 sets for the travel route 905P. The information required for setting of the travel route 905P such as the vehicle width d of the combine harvester 1, a turning radius, the row direction, and whether an excess row can be handled or not only needs to be specified by the operator in advance or when operating the route-setting button image 901P.

The travel route 905P set by the route setting portion 801 is transmitted to the combine harvester 1 by the communication processing portion 72. The communication processing portion 65 of the combine harvester 1 receives the travel route 905P transmitted from the mobile communication terminal 7.

When the travel route 905P for automated travel is set, the display processing portion 86 brings the route-setting button image 901P and the start button image 902P into the active state in which the operator can operate. When the route-setting button image 901P is selected and operated, the route setting portion 801 re-sets the travel route 905P. The travel route 905P re-set by the route setting portion 801 is transmitted to the combine harvester 1 by the communication processing portion 72.

The operator moves the combine harvester 1 by the manual travel to the start "S" position on the travel route 905P for automated travel shown on the display portion 73. After moving the combine harvester 1 to the start "S" position, the operator selects and operates the start button image 902P to start the automated travel of the combine harvester 1. As described above, when the start-position setting portion 89 sets the corner 921P closest to the combine harvester 1 to the automated-travel start position, the combine harvester 1 can suppress unnecessary traveling such as turning, going backward, detouring or the like and can smoothly move to the corner 921P, that is, to the start "S" of the travel route 905P.

When the start button image 902P is selected and operated, the communication processing portion 72 instructs the combine harvester 1 to start the automated travel. When the communication processing portion 65 of the combine harvester 1 receives the automated-travel start instruction, the control portion 50 performs the reaping work while causing the combine harvester 1 to perform the automated travel in accordance with the travel route 905P for automated travel received from the mobile communication terminal 7.

While the combine harvester 1 is automatedly traveling while performing the reaping work, the region setting portion 84 periodically updates the sizes of the worked region and the unworked region on the basis of the position information 99 acquired by the vehicle-position acquiring portion 85. The display processing portion 86 causes the worked region image 91P and the unworked region image 92P updated by the region setting portion 84 to be displayed on the display portion 73. The display processing portion 86 also updates a display position of the icon C1 indicating the current position of the combine harvester 1 on the basis of the position information 99 acquired by the vehicle-position acquiring portion 85.

In FIG. 9, the combine harvester 1 is performing the reaping work while automatedly traveling along the travel route 905P. When the combine harvester 1 is performing the automated travel, the display processing portion 86 brings the route-setting button image 901P into an inactive state in which the operator cannot operate. The display processing portion 86 also changes the start button image 902P to the stop button image 903P. Furthermore, the display processing portion 86 brings the stop button image 903P into the active state in which the operator can operate. The stop button image 903P is an operation button to stop the automated travel of the combine harvester 1.

When the stop button image 903P is selected and operated, the communication processing portion 72 instructs the combine harvester 1 to stop the automated travel. When the communication processing portion 65 of the combine harvester 1 receives the automated-travel stop instruction, the control portion 50 stops the automated travel and the reaping work of the combine harvester 1.

In the example described above, the start-position setting portion 89 sets the automated-travel start position when the combine harvester 1 travels to the inside the automated-travel determining line 93P or when the worked region extends to the inside of the automated-travel determining line 93P, but it is not limited to this example.

For example, the start-position setting portion 89 may set the automated-travel start position when the combine harvester 1 has finished traveling all along the automated-travel determining line 93P. Alternatively, the start-position setting portion 89 may set the automated travel-start position when the combine harvester 1 travels on at least one spot on the automated-travel determining line 93P.

For example, the start-position setting portion 89 may set the automated-travel start position when all the automated-travel determining lines 93P are included in the worked region. Alternatively, the start-position setting portion 89 may set the automated-travel start position when at least a part of the automated-travel determining line 93P is included in the worked region.

For example, the start-position setting portion 89 may also set the automated-travel start position when a predetermined input signal is received. Specifically, the start-position setting portion 89 sets the corner closest to this position information 99 to the automated-travel start position on the basis of the position information 99 when the input signal indicating that the route-setting button image 901P was selected and operated is received from the operation portion 74. In FIG. 8, if the combine harvester 1 is present at the position indicated by the icon C1, and the route-setting button image 901P is selected and operated in this case, the start-position setting portion 89 sets the corner 921P closest to the icon C1 to the automated-travel start position.

It is to be noted that the start-position setting portion 89 may combine a plurality of conditions for setting the automated-travel start position. For example, the start-position setting portion 89 may set the automated-travel start position when the combine harvester 1 travels to the inside the automated-travel determining line 93P, and the route-setting button image 901P is selected and operated.

For example, the start-position setting portion 89 may also set the corner that exists in the advancing direction of the combine harvester 1 and is closest to the position of the combine harvester 1, indicated by an icon C2 (see FIG. 8), among the plurality of corners 921P to 924P of the unworked region indicated by the unworked region image 92P, to the automated-travel start position. The advancing direction of the combine harvester 1 indicated by the icon C2 is the direction indicated by an arrow in the vicinity of the icon C2 (left direction on the FIG. 8 plane). In this case, if the closest corner 921P is set to the automated-travel start position, the combine harvester 1 needs to return from the icon C2 position to the corner 921P to start the automated travel, which requires wasteful travel such as turning, going backward, detouring or the like before starting the automated travel. In contrast, there are the corners 922P, 923P, 924P, and 921P in the advancing direction of the combine harvester 1, in order of proximity from the combine harvester 1. When the start-position setting portion 89 sets the closest corner 922P in the advancing direction to the automated-travel start position, the combine harvester 1 can smoothly head to the corner 922P without wasteful travel.

For example, the start-position setting portion 89 may also set the corner where an unworked region is disposed on a left side of the combine harvester 1 indicated by the icon C1 and is closest to the position of the combine harvester 1 to the automated-travel start position among the plurality of corners 921P to 924P of the unworked region indicated by the unworked region image 92P. The start-position setting portion 89 sets the corner 921P, which is closer to the combine harvester 1, indicated by the icon C1, to the automated-travel start position in the corners 921P and 923P where the unworked region is located on the left side of the combine harvester 1. As a result, when the leftward travel route 905P as shown in FIG. 8 is set, the combine harvester 1 can smoothly head to the corner 921P without wasteful travel.

The display processing portion 86 may cause the corner 921P closest to the combine harvester 1 selected by the start-position setting portion 89 to be highlighted and displayed on the display portion 73. A method of highlighting the corner 921P may be any method that allows the operator to recognize the corner 921P as the automated-travel start position. For example, the display processing portion 86 causes texts, images or the like such as "automated-travel start position" to be displayed in the vicinity of the corner 921P, an icon, a pin or the like to be displayed or to surround the corner 921P with a round frame or the like. As a result, it becomes easier for the operator to cause the combine harvester 1 to manually travel to the automated-travel start position.

In the example described above, the start-position setting portion 89 automatically sets the corner 921P closest to the combine harvester 1 to the automated-travel start position, but it is not limited to this example. For example, the operator may be able to select the automated-travel start position. In this case, the display processing portion 86 causes the corner 921P closest to the combine harvester 1 selected by the start-position setting portion 89 to be displayed on the display portion 73 as a candidate for the automated-travel start position. The operator checks the candidates for the automated-travel start position displayed on the display portion 73 and allows or rejects the candidates by operating the operation portion 74. If the candidate is allowed, the start-position setting portion 89 sets the allowed candidate as the automated-travel start position. On the other hand, if the candidate is rejected, the start-position setting portion 89 allows the operator to select and operate an arbitrary automated-travel start position, for example. Alternatively, the start-position setting portion 89 selects the corner that is second closest to the combine harvester 1 as a candidate for the automated-travel start position and confirms this with the operator, for example.

When having the operator select the automated-travel start position, the display portion 73 displays the row-direction image 906P so that the operator can select the automated-travel start position by considering the row direction of the unworked region. Thus, the operator's convenience can be further improved.

While the combine harvester 1 is automatedly traveling while reaping, the route setting portion 801 may set a discharge route. The route setting portion 801 compares the travelable distance D1 calculated by the calculating portion 88 with the distance from the current position of the combine harvester 1 to the relay region 95 (hereinafter referred to as a relay distance), for example. If the travelable distance D1 is less than the relay distance, the route setting portion 801 sets the discharge route that connects an arbitrary position of the travel route 905P to the relay region 95. The communication processing portion 72 transmits the discharge route set by the route setting portion 801 to the combine harvester 1. The communication processing portion 65 of the combine harvester 1 receives the discharge route transmitted from the mobile communication terminal 7. The control portion 50 causes the combine harvester 1 to deviate from the automated travel route 905P for automated travel, to perform the automated travel in accordance with the discharge route received from the mobile communication terminal 7, and to head for the relay region 95. The position deviated from the travel route 905P for automated travel is referred to as the "return position". The operator discharges the grains from the grain tank 400 in the relay region 95.

When the combine harvester 1 has completed the discharge work, the route setting portion 801 may set the return route. The route setting portion 801 sets the route that connects the relay region 95 to the return position described above as the return route, for example. The communication processing portion 72 transmits the return route set by the route setting portion 801 to the combine harvester 1. The communication processing portion 65 of the combine harvester 1 receives the return route transmitted from the mobile communication terminal 7. The control portion 50 causes the combine harvester 1 to perform the automated travel along the return route received from the mobile communication terminal 7 and to head for the return position present on the travel route 905P for automated travel. After reaching the return position, the combine harvester 1 resumes the reaping work while automatedly traveling along the travel route 905P for automated travel.

It is to be noted that the combine harvester 1 may reciprocate between the travel route 905P for automated travel and the relay region 95 by manual travel. When the combine harvester 1 returns from the relay region 95 to the unworked region by the manual travel, the start-position setting portion 89 may re-set the corner closest to the position of the combine harvester 1 among the plurality of corners of the unworked region to the automated-travel start position. The route setting portion 801 may also re-set the travel route 905P for automated travel, including the automated-travel start position.

Subsequently, with reference to FIGS. 2 to 9, a second message image MSG2 displayed on the display portion 73 will be explained. The second message image MSG2 is an index of work progress. The second message image MSG2 shown in FIG. 6 indicates a progress rate displayed when the operator completes the round reaping in order to set the contour 981P of the field 98 by manual travel. The second message image MSG2 shown in FIG. 7 indicates a progress rate displayed when the operator is performing the round reaping by manual travel in order to generate a headland. The second message image MSG2 shown in FIG. 8 indicates the progress rate displayed when the headland is generated and the operator sets the travel route 905P for automated travel of the combine harvester 1. The second message image MSG2 shown in FIG. 9 indicates the progress rate displayed when the combine harvester 1 is automatedly traveling along the travel route 905P for automated travel while performing the reaping work.

As shown in FIG. 3, the control portion 80 further includes a first acquiring portion 802, a second acquiring portion 803, and a generating portion 804. The arithmetic device of the control portion 80 reads various programs from the storage portion 81 and executes them so as to function as the first acquiring portion 802, the second acquiring portion 803, and the generating portion 804.

The first acquiring portion 802 acquires the first information. Specifically, the first acquiring portion 802 acquires from the storage portion 81 the first information on the work target region to be worked by the combine harvester 1.

The second acquiring portion 803 acquires the second information. Specifically, the second acquiring portion 803 acquires from the storage portion 81 the second information on the worked region.

The generating portion 804 generates progress information. The progress information indicates the progress of the work by the combine harvester 1.

The display processing portion 86 causes the display portion 73 to display an index indicating the progress information. In other words, the display processing portion 86 causes the second message image MSG2 to be displayed on the display portion 73. Therefore, the worked region with respect to the work target region can be notified to the operator by the second message image MSG2, which is an index of the work progress. As a result, the progress of the work can be easily notified to the operator. Thus, the operator can easily manage the progress of the work.

The index indicating the progress information includes at least any one of a distance traveled by the combine harvester 1, time required for the combine harvester 1 to work, and a ratio of an area of the worked region to an area of the work target region. Therefore, the progress of the work can be easily notified to the operator by using the index. As a result, the operator can easily grasp the progress of the work.

The index indicating the progress information includes at least any one of a distance obtained by subtracting the distance traveled by the combine harvester 1 from the total distance to be traveled by the combine harvester 1, time obtained by subtracting the time for which the work vehicle performed the work from the time required to complete the work, and the ratio of the area of the unworked region to the area of the work target region. Therefore, the work progress can be notified to the operator in detail. As a result, the operator can easily grasp the detailed work progress.

For example, if the distance traveled by the combine harvester 1 is an index indicating the progress information, the distance obtained by subtracting the distance traveled by the combine harvester 1 in the field while performing the reaping work from the total travel distance to be traveled by the combine harvester 1 is displayed on the display portion 73. In other words, the display portion 73 displays the second message image MSG2 indicating "N meters to go". "N" indicates a natural number. For example, if the total travel distance is "100 meters" and the distance traveled by the combine harvester 1 in the field while performing the reaping work is "40 meters", the generating portion 804 generates progress information including the remaining travel distance "60 meters to go". The display processing portion 86 controls the display portion 73 so that the display portion 73 displays the second message image MSG2 indicating "600 meters to go". Thus, the operator can know the remaining distance for which the combine harvester 1 travels in the field while performing the reaping work.

For example, if the time required for the combine harvester 1 to work is the index indicating the progress information, the time obtained by subtracting the time for which the combine harvester 1 performed the reaping work from the time required for the combine harvester 1 to complete the reaping work is displayed on the display portion 73. In other words, the display portion 73 displays the second message image MSG2 indicating "N hours to go". For example, if the time required for the combine harvester 1 to complete the reaping work is "10 hours" and the time for which the combine harvester 1 performed the reaping work is "4 hours", the generating portion 804 generates the progress information including the remaining work time "6 hours to go". The display processing portion 86 controls the display portion 73 so that the display portion 73 displays the second message image MSG2 indicating "6 hours to go". Thus, the operator can know the remaining time for the combine harvester 1 to perform the reaping work.

For example, if the ratio of the area of the worked region to the area of the work target region is an index indicating the progress information, the ratio of the area of the unworked region to the area of the work target region is displayed on the display portion 73. In other words, the display portion 73 displays the second message image MSG2 indicating "N % to go". For example, if the work target region is "100 acres" and the worked region is "40 acres", the generating portion 804 generates the progress information including "60% to go", which is the ratio of the area of the unworked region to the area of the work target region. Then, the display processing portion 86 causes the display portion 73 so that the display portion 73 displays the second message image MSG2 indicating "60% to go". Thus, the operator can know the remaining area for the combine harvester 1 to perform the reaping work.

The generating portion 804 may also generate the progress information on the basis of the area of the travel route 905P, the area of the route that the combine harvester 1 has already traveled in the area of the travel route 905P, and the area of the route that the combine harvester 1 has not yet traveled in the area of the travel route 905P. Specifically, the display processing portion 86 displays the ratio of the area of the travel route 905P that has not yet been traveled to the area of the travel route 905P. Thus, the operator can know the remaining area of the travel route of the combine harvester 1.

The control portion 80 of this embodiment will be explained in more detail continuously with reference to FIGS. 1 to 9, FIG. 10, and FIG. 11. As shown in FIG. 3, the control portion 80 further includes a predicting portion 806 and a changing portion 807. The arithmetic device of the control portion 80 reads various programs from the storage portion 81 and executes them so as to function as the predicting portion 806 and the changing portion 807.

The predicting portion 806 predicts the number of times that the combine harvester 1 moves to the relay region 95 until completing the work. Specifically, the predicting portion 806 predicts the number of times that the combine harvester 1 moves to the relay region 95 until completing the work on the basis of the progress information when the combine harvester 1 moves to the relay region 95. For example, if the combine harvester 1 moves to relay region 95 when the second message image MSG2 displayed on the display portion 73 indicates "70% to go", the predicting portion 806 predicts the number of times that the combine harvester 1 moves to the relay region 95 to be "two times" before completing the work. In other words, the predicting portion 806 predicts the movement to the relay region 95 when the second message image MSG2 on the display portion 73 indicates "40% to go" and when the second message image MSG2 on the display portion 73 indicates "10% to go".

Thus, the number of times to move to the relay region 95 can be notified to the operator. As a result, the operator can grasp the number of times when the relay work is generated.

The number of times of the movement to the relay region 95 and the index at the movement to the relay region 95 may be displayed on the display portion 73. For example, the message on the movement to the relay region 95 is displayed when the second message image MSG2 on the display portion 73 indicates "40% to go" and when the second message image MSG2 on the display portion 73 indicates "10% to go". Thus, the operator can know when to move to the relay region 95. As a result, the relay work can be prepared by matching the timing of the movement to the relay region 95. For example, the operator can prepare for a work for discharging the crops harvested by the combine harvester 1 to a truck or the like and for a refueling work for the combine harvester 1. Thus, it is possible to suppress preparation by the operator for the harvesting work after the combine harvester 1 has reached the relay region 95.

Figure 10:
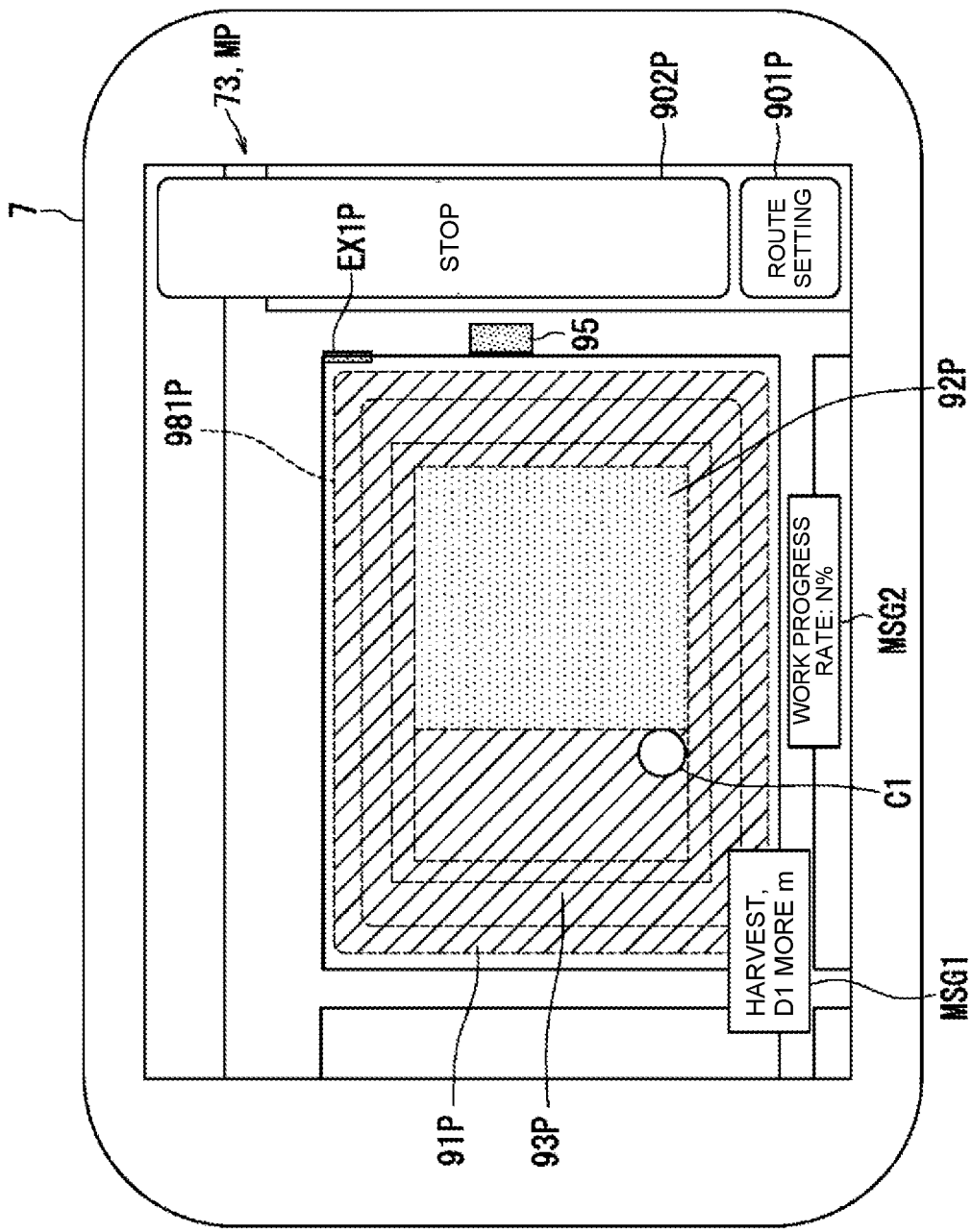
FIG. 10 is a diagram illustrating the display portion which displays a work target region before a change.
Figure 11:
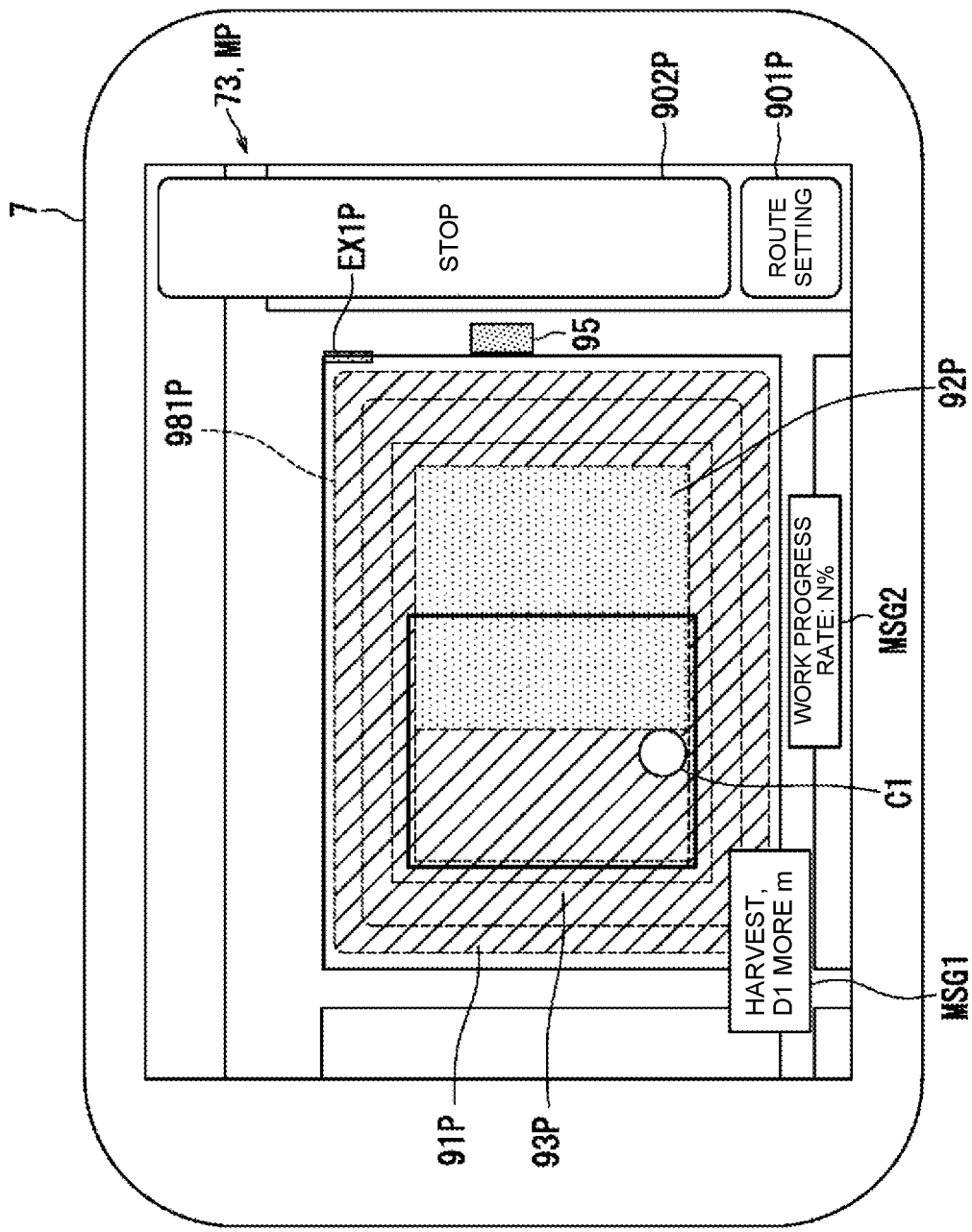
FIG. 11 is a diagram illustrating the display portion which displays the work target region after the change.

Subsequently with reference to FIG. 10 and FIG. 11, processing of changing the work target region will be explained. FIG. 10 shows the display portion 73 which displays a work target region before changing. FIG. 11 shows the display portion 73 which displays the work target region after the change.

The changing portion 807 changes the work target region. Specifically, the changing portion 807 changes, for example, the area of the work target region. For example, the changing portion 807 changes the total travel distance traveled by the combine harvester 1. Furthermore, for example, the changing portion 807 changes the time required for the combine harvester 1 to complete the work.

When the work target region is to be changed, as shown in FIG. 10, for example, the operator selects and operates the work target region displayed on the display portion 73. The work target region shown in FIG. 10 is, for example, "100 acres". The worked region shown in FIG. 10 is "40 acres". For example, the second message image MSG2 indicates "60% to go".

The work target region deforms in response to the operator's operation. Although the case in which the work target region is to be reduced will be explained as an example in this embodiment, a change to enlarge the work target region may also be made. For example, the operator changes the work target region to an intended size, as shown in FIG. 11. The work target region shown in FIG. 11 is, for example, "60 acres". Moreover, the worked region shown in FIG. 11 is "40 acres". In FIG. 11, the second message image MSG2 indicates "33% to go". In other words, the rate of remainder requiring the work is changed in accordance with the change in size of the work target region.

The region setting portion 84 also sets the work target region in which the combine harvester 1 works to a changed work target region A. In FIG. 11, the changed work target region A is indicated by a rectangular bold line. The region setting portion 84 outputs information on the changed work target region A to the control portion 80. The control portion 80 controls the storage portion 81 so that the storage portion 81 stores the information on the changed work target region A.

When the changing portion 807 is to change the work target region, the first acquiring portion 802 acquires information on the changed work target region A from the storage portion 81. The second acquiring portion 803 then acquires the second information. Furthermore, the generating portion 804 generates progress information on the basis of the information on the changed work target region A and the second information. Thus, the progress of work on the changed work target region can be reported to the operator. As a result, it becomes easy to manage the progress of work even if the work target region is changed. In addition, the work progress can be managed even when the work region is changed in the middle of the work, taking into account of the work time.

Figure 12:
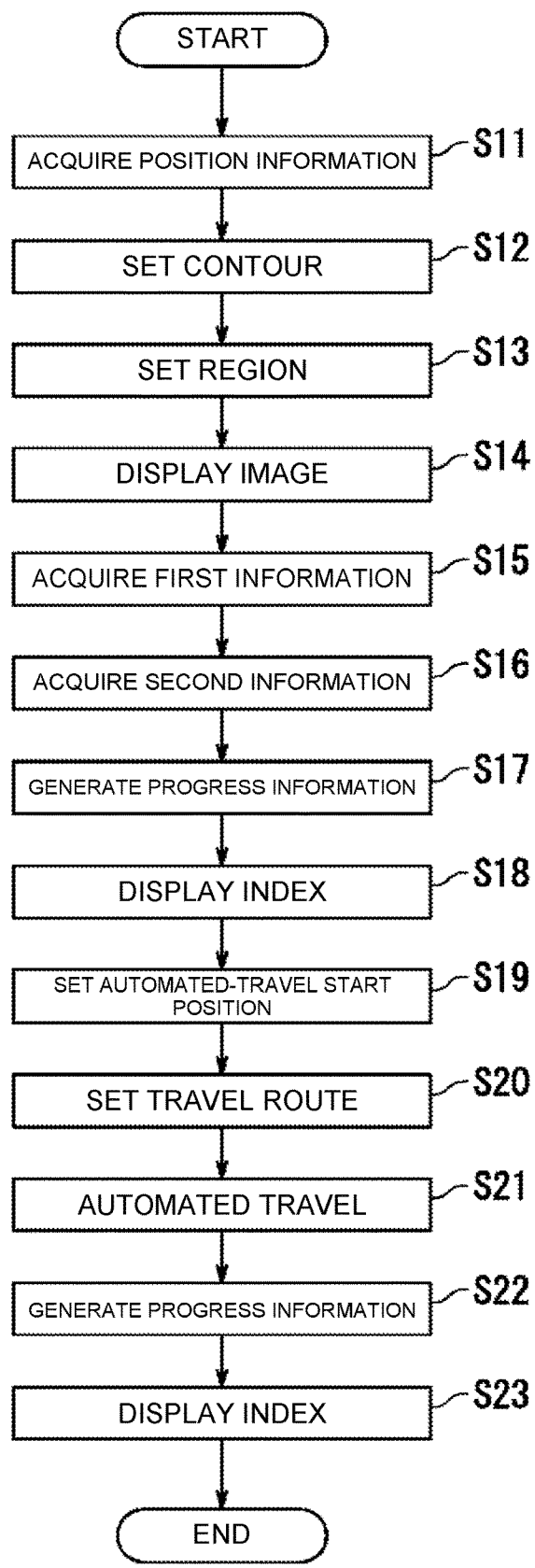
FIG. 12 is a flowchart of processing executed by a control portion according to this embodiment.

Subsequently, with reference to FIG. 12, the processing executed by the control portion 80 according to this embodiment will be explained. FIG. 12 is a flowchart of the processing executed by the control portion 80 according to this embodiment. The processing executed by the control portion 80 includes Step S11 to Step S18.

At Step S11, the vehicle-position acquiring portion 85 acquires the position information 99 of the combine harvester 1. The processing proceeds to Step S12.

At Step S12, the field-contour setting portion 83 sets the contour 981P of the field 98 on the basis of a plurality of pieces of the position information 99 acquired by the vehicle-position acquiring portion 85. The processing proceeds to Step S13.

At Step S13, the region setting portion 84 sets a region not subject to the work indicating a region which is not a target for the harvesting operation by the combine harvester 1 inside the field 98 or outside the field 98 on the basis of the contour 981P. The region setting portion 84 also sets the worked region and the unworked region inside the field 98 on the basis of the plurality of pieces of position information 99 acquired by the vehicle-position acquiring portion 85 and updates them periodically. The region setting portion 84 also sets the automated-travel determining line 93P inside the contour 981P. The processing proceeds to Step S14.

At Step S14, the display processing portion 86 causes an identification image to identify the region not subject to the work to be displayed on the display portion 73. The display processing portion 86 also causes the worked region image 91P to identify the worked region and the unworked region image 92P to identify the unworked region to be displayed on the display portion 73. In addition, the display processing portion 86 may cause the route-setting button image 901P, the start button image 902P, the row-direction image 906P and the like to be displayed on the display portion 73. The processing proceeds to Step S15.

At Step S15, the first acquiring portion 802 acquires the first information. The first acquiring portion 802 regularly acquires the first information. The processing proceeds to Step S16.

At Step S16, the second acquiring portion 803 acquires the second information. The second acquiring portion 803 regularly acquires the second information. The processing proceeds to Step S17.

At Step S17, the generating portion 804 generates the progress information indicating the progress of the work by the combine harvester 1 on the basis of the first information and the second information. The processing proceeds to Step S18.

At Step S18, the display processing portion 86 causes the display portion 73 to display an index indicating the progress information. The index indicating the progress information includes at least any one of a distance traveled by the combine harvester 1, time required for the combine harvester 1 to work, and a ratio of an area of the worked region to an area of the work target region. The processing proceeds to Step S19.

At Step S19, when a predetermined condition is satisfied, the start-position setting portion 89 sets the corner closest to the position of the combine harvester 1 among the plurality of corners 921P to 924P of the unworked region to the automated-travel start position on the basis of the position information 99 (Step S15). The predetermined condition is satisfied, when the combine harvester 1 travels inside the automated-travel determining line 93P, for example. The processing proceeds to Step S20.

At Step S20, the route setting portion 801 sets the travel route 905P for automated travel including the automated-travel start position to the unworked region. The communication processing portion 72 transmits the travel route 905P for automated travel to the combine harvester 1. The display processing portion 86 causes the travel route 905P for automated travel to be displayed on the display portion 73. The processing proceeds to Step S21.

At Step S21, the operator moves the combine harvester 1 to the start "S" position on the travel route 905P and selects and operates the start button image 902P. When the start button image 902P is selected and operated, the communication processing portion 72 instructs the combine harvester 1 to start the automated travel. When the communication processing portion 65 of the combine harvester 1 receives the automated-travel start instruction, the control portion 50 performs the reaping work while causing the combine harvester 1 to perform the automated travel in accordance with the travel route 905P for automated travel. At Step S21, the predicting portion 806 may predict the number of times that the combine harvester 1 moves to the relay region 95 until the work is completed. The processing proceeds to Step S22.

At Step S22, the generating portion 804 generates the progress information according to the reaping work. Specifically, the generating portion 804 generates the progress information according to the reaping work on the basis of the first information according to the reaping work and the second information according to the reaping work. When the changing portion 807 is to change the work target region, the generating portion 804 generates the progress information according to the reaping work on the basis of the information on the changed work target region A and the second information. The processing proceeds to Step S23.

At Step S23, the display processing portion 86 causes an index indicating the progress information to be displayed on the display portion 73. The process is then finished.

In this embodiment, Steps S15 to S18 may be executed after Step S12 is executed. In other words, the progress information at the time when the field-contour setting portion 83 sets the contour can be notified to the operator. Step S22 and Step S23 may be executed repeatedly. In other words, the index indicating the progress information according to the reaping work is updated.

Variation 1

Subsequently, by referring to FIGS. 1 to 7 and FIG. 13, the crop harvesting system 100 according to this variation 1 of the embodiment 1 will be explained. The crop harvesting system 100 of the variation 1 is different from the crop harvesting system 100 of the embodiment 1 in a point that a plurality of combine harvesters 1 perform the work. Hereinafter, in the variation 1, main points different from the embodiment 1 will be explained.

Figure 13:
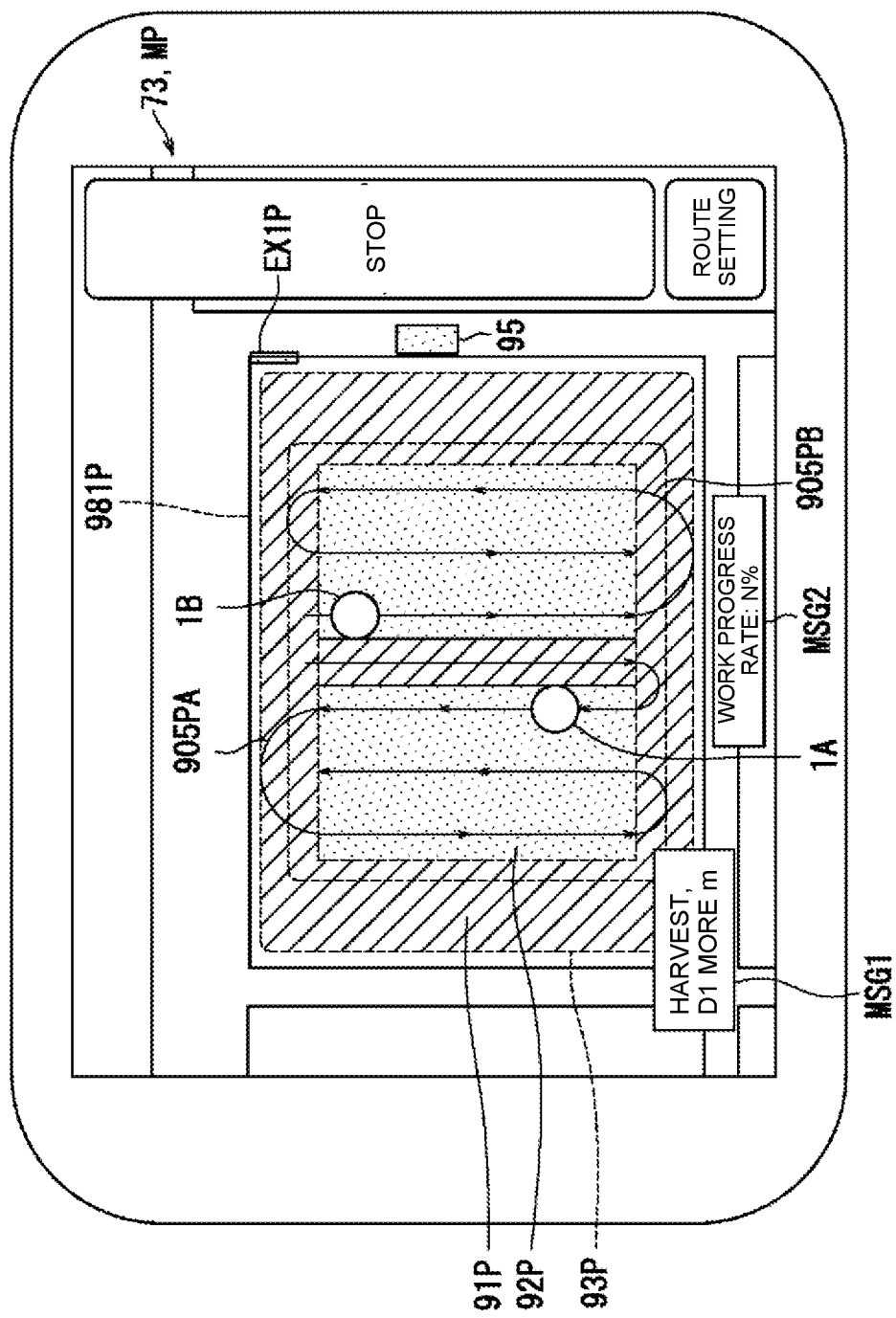
FIG. 13 is a diagram illustrating a figure in which two combine harvesters of a variation 2 are disposed in one field.

FIG. 13 illustrates a diagram in which in which two combine harvesters 1 of this embodiment are disposed in one field. As shown in FIG. 13, in the variation 1, the first combine harvester 1A and the second combine harvester 1B execute the reaping work in the work target region. In the variation 1, the first combine harvester 1A and the second combine harvester 1B can communicate with the mobile communication terminal 7, respectively.

When the first combine harvester 1A and the second combine harvester 1B are to perform the reaping work, the operator completes one round of the round reaping to set the contour 981P of the field 98 by the manual travel of the first combine harvester 1A. The operator completes one more round of the round reaping to generate a headland by the manual travel of the first combine harvester 1A. Then, the operator performs a mid-splitting work by the first combine harvester 1A. The mid-splitting work is a work to divide the work target region into a plurality of parts. In this embodiment, in the mid-splitting work, the division is made into a part where the first combine harvester 1A performs the reaping work and a part where the second combine harvester 1B performs the reaping work.

When the mid-splitting work is completed, the region setting portion 84 sets the work target region to be worked by the first combine harvester 1A and the work target region to be worked by the second combine harvester 1B. The work target region to be worked by the first combine harvester 1A is output as the first information to the control portion 80. The work target region to be worked by the second combine harvester 1B is output as third information to the control portion 80. The control portion 80 controls the storage portion 81 so that the storage portion 81 stores the first information and the third information.

When the operator selects and operates the route-setting button image 901P, the start-position setting portion 89 sets the automated-travel start position of the first combine harvester 1A on the basis of the position information 99. Then, the route setting portion 801 sets a travel route 905PA for automated travel including the automated-travel start position to the unworked region where the first combine harvester 1A performs the reaping work.

The start-position setting portion 89 also sets the automated-travel start position of the second combine harvester 1B on the basis of the position information 99. Then, the route setting portion 801 sets a travel route 905PB for automated travel including the automated-travel start position to the unworked region where the second combine harvester 1B performs the reaping work.

The communication processing portion 72 transmits the travel route 905PA to the first combine harvester 1A. The communication processing portion 65 of the first combine harvester 1A receives the travel route 905PA transmitted from the mobile communication terminal 7. Then, the first combine harvester 1A moves to the start position by manual travel. Furthermore, when the operator operates the start button image 902P, the control portion 50 of the first combine harvester 1A performs the reaping work while automatedly traveling the first combine harvester 1A in accordance with the travel route 905PA for automated travel received from the mobile communication terminal 7.

The communication processing portion 72 also transmits the travel route 905PB to the second combine harvester 1B. The communication processing portion 65 of the second combine harvester 1B receives the travel route 905PB transmitted from the mobile communication terminal 7. Then, the second combine harvester 1B moves to the start position by manual travel. Furthermore, when the operator operates the start button image 902P, the control portion 50 of the second combine harvester 1B performs the reaping work while causing the second combine harvester 1B to perform the automated travel in accordance with the travel route 905PB for automated travel received from the mobile communication terminal 7.

Then, the region setting portion 84 sets the trajectory of the reaping work by the first combine harvester 1A to the worked region. The region setting portion 84 outputs the information on the worked region where the first combine harvester 1A performed the reaping work as the second information to the control portion 80. The region setting portion 84 also sets the trajectory of the reaping work by the second combine harvester 1B to the worked region. The region setting portion 84 outputs the information on the worked region where the second combine harvester 1B performed the reaping work as fourth information to the control portion 80. The control portion 80 controls the storage portion 81 so that the storage portion 81 stores the second information and the fourth information. While the first combine harvester 1A and the second combine harvester 1B are automatedly traveling while performing the reaping work, the region setting portion 84 periodically updates the second information and the fourth information on the basis of the position information 99 acquired by the vehicle-position acquiring portion 85.

In the variation 1 of the embodiment 1, the first acquiring portion 802 acquires the first information and the third information. The second acquiring portion 803 acquires the second information and the fourth information. Then, the generating portion 804 generates the progress information by the first combine harvester 1A and the second combine harvester 1B on the basis of the first, second, third and fourth information. In other words, the progress of the reaping work performed by the first combine harvester 1A and the second combine harvester 1B is displayed as the second message image MSG2 on the display portion 73. Therefore, the progress worked by the two combine harvesters 1 can be displayed. As a result, the progress of the work can be easily notified to the operator.

As shown in FIG. 13, the total progress rate of the two combine harvesters 1 is exemplified as "progress rate N %" in the variation 1, but it is not limiting. For example, each of the progress rate of the first combine harvester 1A and the progress rate of the second combine harvester 1B may be displayed as the second message image MSG2 on the display portion 73.

Variation 2

Subsequently, by referring to FIGS. 1 to 7 and FIG. 14, the crop harvesting system 100 according to a variation 2 of the embodiment 1 will be explained. The crop harvesting system 100 of the variation 2 is different from the crop harvesting system 100 of the embodiment 1 in a point that the combine harvester 1 performs the work in a plurality of the fields. Hereinafter, in the variation 2, main points different from the embodiment 1 will be explained.

FIG. 14 is a diagram illustrating the combine harvester 1 according to the variation 2 of the embodiment 1 and the plurality of fields 98. The plurality of fields 98 includes a first field 98A, a second field 98B, a third field 98C, and a fourth field 98D. In the variation 2, an example in which the combine harvester 1 performs reaping work in the first field 98A and the second field 98B will be explained.

The operator completes one round of the round reaping to set a contour 981A of the first field 98A by the manual travel. Then, the operator completes one more round of the round reaping to generate the headland by the manual travel. The region setting portion 84 then sets the work target region, the worked region, and the unworked region of the first field 98A. The region setting portion 84 outputs information on the work target region in the first field 98A as the first information to the control portion 80. The region setting portion 84 also outputs information on the worked region in the first field 98A as the second information to the control portion 80. The control portion 80 controls the storage portion 81 so that the storage portion 81 stores the first information and the second information.

Subsequently, the operator completes one round of the round reaping to set a contour 981B of the second field 98B by the manual travel. Then, the operator completes one more round of the round reaping to generate the headland by the manual travel. Then, the region setting portion 84 sets the work target region, the worked region, and the unworked region of the second first field 98B. The region setting portion 84 outputs information on the work target region in the second field 98B as the fifth information to the control portion 80. The region setting portion 84 outputs information on the worked region in the second field 98B as the sixth information to the control portion 80. The control portion 80 controls the storage portion 81 so that the storage portion 81 stores the fifth information and the sixth information.

Then, the first acquiring portion 802 acquires the first information and the fifth information. Furthermore, the second acquiring portion 803 acquires the second information and the sixth information. Subsequently, the generating portion 804 generates the progress information indicating the work progress by the combine harvester 1 on the basis of the first, second, and fifth information. Therefore, the work progress when the combine harvester 1 is working in the plurality of fields can be notified to the operator. As a result, it becomes easier to manage the progress when the harvesting operation is performed in the plurality of fields.

The generating portion 804 may generate the progress information indicating the work progress by the combine harvester 1 on the basis of the first, second, fifth and sixth information. Therefore, the work progress when the combine harvester 1 is working in the plurality of fields can be notified in detail to the operator. As a result, it becomes further easier to manage the progress when the harvesting operation is performed in the plurality of fields.

The embodiments of the present invention have been described above by referring to the drawings. However, the present invention is not limited to the embodiment described above but can be worked in various modes in a range not departing from the gist thereof. In addition, the plurality of constituent elements disclosed in the above embodiment may be modified as appropriate. For example, one constituent element of all the constituent elements shown in one embodiment may be added to the constituent element of another embodiment, or some constituent elements of all the constituent elements shown in one embodiment may be removed from the embodiment.

The drawings schematically illustrate mainly each of the constituent elements in order to facilitate understanding of the invention, and a thickness, a length, the number, an interval and the like of each of the illustrated constituent elements may be different from the actual ones due to convenience of the drawings. In addition, it is needless to say that the configuration of each constituent element shown in the above embodiment is merely an example and is not particularly limited, and various modifications may be made without substantially departing from the effect of the present invention.

In the embodiment 1, the control portion 80 of the mobile communication terminal 7 includes the field-contour setting portion 83, the region setting portion 84, the vehicle-position acquiring portion 85, the display processing portion 86, the yield-information acquiring portion 87, the calculating portion 88, the start-position setting portion 89, the route setting portion 801, the first acquiring portion 802, the second acquiring portion 803, the generating portion 804, the predicting portion 806, and the changing portion 807, but it is not limiting. The control portion 50 of the combine harvester 1 may include the field-contour setting portion 83, the region setting portion 84, the vehicle-position acquiring portion 85, the display processing portion 86, the yield-information acquiring portion 87, the calculating portion 88, the start-position setting portion 89, the route setting portion 801, the first acquiring portion 802, the second acquiring portion 803, the generating portion 804, the predicting portion 806, and the changing portion 807.

INDUSTRIAL APPLICABILITY

The present invention can be used for work vehicles capable of the automated travel.

REFERENCE SIGNS LIST

1 Combine harvester (work vehicle)
73 Display portion
86 Display processing portion
95 Relay region
98 Field
801 Route setting portion
802 First acquiring portion
803 Second acquiring portion
804 Generating portion
806 Predicting portion
807 Changing portion
905P Travel route
905PA Travel route
905PB Travel route

The invention claimed is:

1. A control device, comprising:
a first acquiring portion which acquires first information on a work target region in which a work vehicle travels and works in a field, wherein the first information comprises an area of the work target region;
a second acquiring portion which acquires second information on a worked region in which the work vehicle has worked, wherein the second information comprises an area of the worked region;
a changing portion, which changes the work target region in the field,
a generating portion which generates progress information indicating progress of the work by the work vehicle on the basis of the first information and the second information of the changed work target region; and
a display processing portion which causes an index indicating the progress information to be displayed on the display portion, wherein the displayed progress information is based on the on the first information and the second information of the changed work target region.

2. The control device according to claim 1, wherein the index further includes at least one of a distance to be traveled by the work vehicle in the changed work target region, or a time for the work vehicle to work in the changed work target region, or a ratio of an area of the worked region comprised in the changed work target region to an area of the changed work target region.

3. The control device according to claim 1, wherein the index further includes at least one of a remaining distance obtained by subtracting a distance traveled by the work vehicle in the changed work target region from a total distance to be traveled by the work vehicle in the changed work target region, or a remaining time obtained by subtracting time for which the work vehicle performed the work in the changed work target region from time required to complete the work in the changed work target region, or a ratio of an area of an unworked region comprised in the changed work target region to an area of the changed work target region.

4. The control device according to claim 3, further comprising:
a route setting portion which sets a travel route on which the work vehicle travels, wherein the generating portion generates the progress information on the basis of the travel route, a route that the work vehicle has already traveled in the travel route, and a route that the work vehicle has not yet traveled in the travel route.

5. The control device according to claim 1, wherein
the first acquiring portion acquires the first information and third information on a work target region in which a work vehicle different from the work vehicle works;
the second acquiring portion acquires the second information and fourth information on a worked region in which the different work vehicle worked; and
the generating portion generates progress information by the work vehicle and the different work vehicle on the basis of the first information, the second information, the third information, and the fourth information.

6. The control device according to claim 1, further comprising:
a predicting portion which predicts the number of times that the work vehicle moves to a relay region until the work vehicle completes a work on the basis of the progress information when the work vehicle moves to the relay region, wherein
the relay region indicates a region through which the work vehicle goes when performing the work.

7. The control device according to claim 1, wherein
the first acquiring portion acquires fifth information on a work target region in a field different from the field;
the generating portion generates the progress information on the basis of the first information, the second information, and the fifth information.

8. A work vehicle capable of manual travel and automated travel, comprising:
the control device according to claim 1.

* * * * *